US012358022B2

(12) United States Patent
Johnson et al.

(10) Patent No.: US 12,358,022 B2
(45) **Date of Patent: *Jul. 15, 2025**

(54) PLANT PRODUCT EXTRACTION APPARATUS

(71) Applicant: Chad M. Johnson, Frankfort, IL (US)

(72) Inventors: Chad M. Johnson, Frankfort, IL (US); Matthew Long, Lakemoor, IL (US); Paul Herrera, St. Charles, IL (US)

(73) Assignee: Chad M. Johnson, Frankfort, IL (US)

( * ) Notice: Subject to any disclaimer, the term of this patent is extended or adjusted under 35 U.S.C. 154(b) by 278 days.

This patent is subject to a terminal disclaimer.

(21) Appl. No.: 18/101,073

(22) Filed: Jan. 24, 2023

(65) Prior Publication Data

US 2023/0166296 A1 Jun. 1, 2023

Related U.S. Application Data

(63) Continuation-in-part of application No. 17/168,866, filed on Feb. 5, 2021, now Pat. No. 11,559,828.

(Continued)

(51) Int. Cl.

| | |
|---|---|
| ***B07B 1/30*** | (2006.01) |
| ***B07B 1/46*** | (2006.01) |
| ***B07B 15/00*** | (2006.01) |

(52) U.S. Cl.

CPC .............. *B07B 1/30* (2013.01); *B07B 1/4609* (2013.01); *B07B 15/00* (2013.01); *B07B 2201/04* (2013.01)

(58) Field of Classification Search

CPC .... B07B 1/38; B07B 1/30; B07B 1/40; B07B 1/42; B07B 1/4609; B07B 15/00

See application file for complete search history.

(56) References Cited

U.S. PATENT DOCUMENTS

| | | | |
|---|---|---|---|
| 1,500,850 | A | 7/1924 | Rush |
| 2,723,031 | A | 11/1955 | Sweet |

(Continued)

FOREIGN PATENT DOCUMENTS

| | | |
|---|---|---|
| CN | 101966519 | 2/2011 |
| CN | 202045073 | 11/2011 |

(Continued)

OTHER PUBLICATIONS

"The Kief Thief: Dry Sift Extractor" Web page <http://thekiefthief.com/>, 1 page Nov. 18, 2018, retrieved from Internet Archive Wayback Machine <http://web.archive.org/web/20181118052107/https://thekiefthief.com/#> on Jun. 22, 2021.

(Continued)

*Primary Examiner* — Patrick H MacKey

(74) *Attorney, Agent, or Firm* — Gardner, Linn, Burkhart & Ondersma LLP

(57) ABSTRACT

A plant product extraction apparatus or extractor is provided for separating or grading fine particles from a larger portion of material, such as separating trichomes from a stalk or flower of a plant. The apparatus imparts a plurality modes or patterns of oscillations and vibrations to a particle separator or sieve that holds the plant matter. A motor drives a back and forth motion to a support platform supporting a sieve. The sieve is constrained by a retention tray that is supported by the support platform. One or more vibratory motors provide rapid shaking vibration through the retention tray to the sieve. A haptic transducer or mechanical agitators may be provided to increase throughput of the apparatus. The various motors and locomotion patterns facilitate the separation of finer plant materials from a larger portion of a plant.

20 Claims, 15 Drawing Sheets

Related U.S. Application Data

(60) Provisional application No. 62/971,440, filed on Feb. 7, 2020.

(56) References Cited

U.S. PATENT DOCUMENTS

| | | | | |
|---|---|---|---|---|
| 2,831,576 | A | 4/1958 | Wehner | |
| 2,874,841 | A | 2/1959 | Peterson | |
| 2,947,410 | A | 8/1960 | Carrier, Jr. | |
| 3,161,587 | A | 12/1964 | Bach | |
| 3,581,598 | A | 6/1971 | Allgaier et al. | |
| 3,790,091 | A | 2/1974 | Law et al. | |
| 4,125,335 | A | 11/1978 | Blume et al. | |
| 4,233,151 | A | 11/1980 | Gundlach | |
| 4,307,808 | A | 12/1981 | Johnson | |
| 4,319,991 | A | 3/1982 | Crone, Jr. et al. | |
| 5,108,588 | A | 7/1992 | Yu | |
| 6,029,822 | A | 2/2000 | Skoropa | |
| 6,425,485 | B1 | 7/2002 | Mankosa et al. | |
| 7,377,960 | B2 | 5/2008 | Bertram et al. | |
| 8,640,877 | B1 | 2/2014 | Pastorius | |
| 8,943,745 | B2 | 2/2015 | Sexton et al. | |
| 9,010,540 | B2 | 4/2015 | Smith et al. | |
| 9,718,065 | B1 | 8/2017 | Cilia | |
| 9,782,801 | B2 | 10/2017 | Alamzad et al. | |
| 10,227,729 | B2 | 3/2019 | Mohammadi et al. | |
| 10,357,802 | B2 | 7/2019 | Lunnemann et al. | |
| 11,559,828 | B2 * | 1/2023 | Johnson | B07B 1/38 |
| 2011/0023433 | A1 | 2/2011 | Lafargue et al. | |
| 2014/0048456 | A1 | 2/2014 | Adams, Sr. et al. | |
| 2016/0108555 | A1 | 4/2016 | Rosado | |
| 2017/0001200 | A1 | 1/2017 | Leffel | |
| 2017/0202896 | A1 | 7/2017 | Hugh | |
| 2018/0193880 | A1 | 7/2018 | Dumbaugh | |
| 2019/0201936 | A1 | 7/2019 | Rystadt et al. | |
| 2023/0166296 | A1 * | 6/2023 | Johnson | B07B 1/4609 209/2 |
| 2024/0399419 | A1 * | 12/2024 | Tsai | B07B 1/38 |

FOREIGN PATENT DOCUMENTS

| | | | |
|---|---|---|---|
| CN | 205946615 | | 2/2017 |
| CN | 107470138 | | 12/2017 |
| CN | 206951575 | | 2/2018 |
| CN | 107812706 | | 3/2018 |
| CN | 106179950 | | 7/2018 |
| CN | 109046940 | | 12/2018 |
| CN | 117654887 | A * | 3/2024 |
| CN | 118455075 | A * | 8/2024 |
| GB | 2351927 | | 1/2001 |
| NL | 1005871 | | 10/1998 |

OTHER PUBLICATIONS

YouTube Video, "Dry Sift Solutions DS1000R", published Oct. 18, 2016, accessed Jun. 22, 2021, https://www.youtube.com/watch?v=FffaLh7L_4o.

"PollenMasters: Dry Sift Tumbler" Web page <http://www.pollenmasters.com>, 1 page Nov. 18, 2018, retrieved from Internet Archive Wayback Machine <http://web.archive.org/web/20181118055552/https://www.pollenmasters.com/> on Jun. 22, 2021.

"Bubble Man's Tumble Now Machine" Web page <https://www.bubblebag.com/tumblenow.php>, 1 page Apr. 19, 2018, retrieved from Internet Archive Wayback Machine <https://web.archive.org/web/20180419095534/https://www.bubblebag.com/tumblenow.php> on Jun. 22, 2021.

YouTube Video, "Rosin Industries Pollenex in action", published Jan. 9, 2018, accessed Jun. 22, 2021, https://www.youtube.com/watch?v=I2jJpX-WKhY.

"Bubble Now" Web page <http://www.bubblebag.com/bubblenow.php>, 1 page Apr. 14, 2018, retrieved from Internet Archive Wayback Machine <https://web.archive.org/web/20180414014652/http://www.bubblebag.com/bubblenow.php> on Jun. 22, 2021.

"Dry Sift Wizard: 3 Screen Kit Dry Sifter" Web page <http://drysiftwizard.weebly.com/store/p1/3_Screen_kit_-_Top,_bottom,_refine.__.html >, 1 page Jul. 7, 2016, retrieved from Internet Archive Wayback Machine <https://web.archive.org/web/20160707203316/http://drysiftwizard.weebly.com/store/p1/3_Screen_kit_-_Top%2C_bottom%2C_refine.__.html> on Jun. 22, 2021.

Hydrobuilder "Thousand Per Hour 512 Pre Roll Cone Machine," downloaded from https://hydrobuilder.com/thousand-per-hour-512-pre-roll-cone-machine.html, believed to have been published prior to Jan. 24, 2023.

* cited by examiner

PLANT PRODUCT EXTRACTION APPARATUS

CROSS REFERENCE TO RELATED APPLICATIONS

The present application is a continuation-in-part of U.S. patent application Ser. No. 17/168,866, filed Feb. 5, 2021, now U.S. Pat. No. 11,559,828, issued Jan. 24, 2023, which claims priority of U.S. provisional application Ser. No. 62/971,440, filed Feb. 7, 2020, both of which are hereby incorporated herein by reference in their entireties.

FIELD OF THE INVENTION

The present invention is directed to a particle separation apparatus, and in particular an apparatus for separating finer particles of a plant from a larger portion of the plant.

BACKGROUND OF THE INVENTION

Separating plant or herb particles from the entire plant or larger portion of a plant include manually or mechanically sifting the plant material to separate the finer portion of the plant matter, such as herbal extract. Manual devices used include sieves, tumblers, or bubble bags. Mechanical devices separate fine particles from plants with vibration. Separation of plant particles is a time consuming process often requiring extensive physical labor or expensive, large-scale equipment.

SUMMARY OF THE INVENTION

The present invention provides a plant product extraction apparatus or a particle size separating apparatus for extracting or separating and segregating smaller size products of a plant or other material from a larger portion of the plant or material. The apparatus employs a plurality of motors to drive a plurality of vibrations or oscillations to a particle separation apparatus or separator, such as a sieve or similar apparatus, to facilitate separation of different product or particle sizes of the material that is being sifted. The apparatus generates a plurality of patterns and/or amplitudes of vibration and oscillation to aid in the separation of plant products. The apparatus is adept at removing fine plant matter, such as trichomes or herbal extracts, from larger portions of the plant, such as leaves and stalks. However, the apparatus is also useful for separation or gradation of different particle sizes of a material, such as for soil gradation analysis. The extraction apparatus is particularly useful for table top or benchtop use to allow a user to extract plant products from a low volume of material, although it may be scaled and adapted for use with large volumes of material.

According to a form of the present invention, a particle extraction apparatus is provided for separating smaller portions or particles of a product or material, such as a plant, from a larger portion of the material. For example, separating trichomes from leaves, stalks, or flowers of a plant. The extraction apparatus includes an oscillation assembly or oscillator to impart a form of oscillation to a separator and a vibration assembly or vibrator to impart a form of vibration to the separator. The oscillator and the vibrator both act to move the separator to facilitate separation of the small particles from the larger portion of material. The oscillator and vibrator may be operated independently or in coordination with one another, and may impart different modes, patterns, or types of vibration or oscillation to the separator.

In one aspect, the plant product extraction apparatus includes a separator retention platform or tray disposed on a support platform. The support platform is configured to move or slide back and forth horizontally to impart a reciprocating oscillation to the separator. A support rail assembly is provided to support the support platform and to define a horizontal and/or linear travel path for the support platform. The support rail assembly includes one or more support or guide rails along which the support platform is moveably supported. The oscillator is configured to mechanically drive the support platform back and forth along the support rail. The retention tray is configured to retain the separator horizontally relative to the support platform such that as the support platform oscillates back and forth, the separator is substantially constrained from lateral movement relative to the support platform, i.e. the separator does not slide off the support platform during operation of the extraction apparatus.

In another aspect, the oscillator includes a motor coupled to a first end of a linkage assembly. The motor drives the linkage assembly in a reciprocating motion. The linkage assembly is coupled at a second end to the support platform such that the reciprocating motion of the linkage assembly drives the horizontal back and forth oscillation of the support platform. The separator is retained in the retention tray and experiences the back and forth oscillation as the support tray is driven back and forth along the rail. The vibrator includes a vibratory motor disposed on or inside of a portion of the retention tray such that the vibratory motor imparts a vibration or shaking to the retention tray and thereby to the separator.

In yet another aspect of the present invention, isolators are disposed between the support platform and the retention tray, or are disposed on mechanical fasteners that secure the retention tray to the support platform. The isolators permit limited vertical and horizontal translation of the retention tray relative to the support platform. The limited vertical and horizontal translation of the retention tray further facilitates separation of the plant materials. In a further aspect, a plurality of agitators may be disposed inside of the separator to interact with the plant material to facilitate separation of smaller plant materials from a larger portion of the plant.

In another form of the present invention, a plant matter separation apparatus is provided for separating smaller portions or particles of a plant from a larger portion of the plant. The extraction apparatus includes a support base for supporting a pair of parallel rails in spaced arrangement, a support platform slideably coupled to the pair of rails and configured to move freely along the rails in the direction parallel to the rails, and a retention tray coupled to the support platform. The retention tray is configured to receive and horizontally constrain a separator relative to the support platform. The separation apparatus includes a linear drive assembly adapted to drive the support platform horizontally back and forth along the parallel rails relative to the support base. The separation apparatus further includes a vibratory motor coupled with the retention tray, and the vibratory motor is adapted to shake the retention tray and thereby shake the separator retained in the retention tray. The linear drive assembly and the vibratory motor cooperate to vibrate the separator to facilitate separation of smaller plant materials from a larger portion of the plant.

In one aspect, the extraction apparatus includes a pair of vibratory motors, each disposed at an opposite end of the retention tray. Each of the vibratory motors is an eccentric rotating mass motor having a cylindrical body. The vibratory motors are oriented on the retention tray such that the longitudinal axis of the vibratory motor's cylindrical body is oriented perpendicular to the pair of parallel rails. Each vibratory motor is configured to impart a shaking vibration to the retention tray in a direction perpendicular to the longitudinal axis of the vibratory motor. Optionally, the longitudinal axis of the cylindrical body of the vibratory motors may be oriented in a direction other than perpendicular to the parallel rails to alter the direction of vibration from the vibratory motors relative to the rails.

In yet another aspect, the support base includes a hollow chamber formed in an interior of the support base. The moving components of the apparatus are confined inside of the hollow chamber, such as including the support rails, the particle separation apparatus, the retention tray, the drive assembly, and the vibratory motor. In other words, the operation movements of the particle extraction apparatus are confined within an envelope defined by the hollow chamber. Confining the moving components in the hollow chamber reduces or eliminates the potential that a user will be injured while the plant extraction apparatus is operating and also protects the moving components from being impacted or jammed by foreign objects.

Accordingly, the plant product extraction apparatus imparts vibratory or oscillatory motion to a sieve to extract and separate finer plant particles from a larger portion of a plant that is disposed inside of the sieve. The extraction apparatus enables multiple patterns and forms of vibration and oscillation to facilitate separation of the finer materials from the larger material. The extraction apparatus provides for home and personal use separation and extraction of fine particles from a larger material. While the embodiments of the present invention are directed to separating smaller portions or particles of plant materials from a larger portion of the plant, it will be appreciated that the extraction apparatus may be used with other materials. For example, the extraction apparatus may be used to grade or segregate different particle sizes of materials such as for particle gradation analysis.

These and other objects, advantages, purposes and features of this invention will become apparent upon review of the following specification in conjunction with the drawings.

DESCRIPTION OF THE PREFERRED EMBODIMENTS

Figure 1:
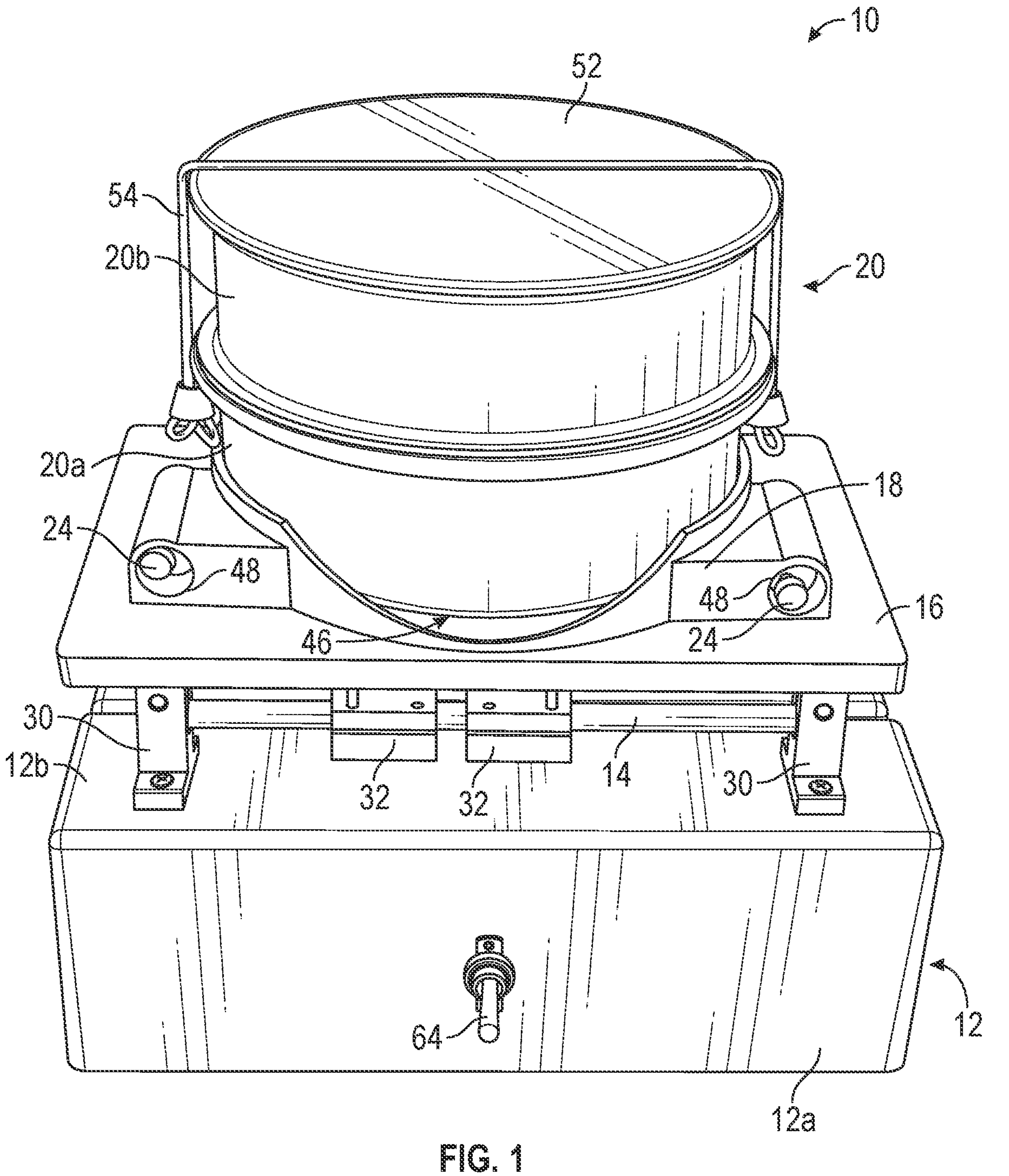
FIG. 1 is a front perspective view of a plant product extraction apparatus in accordance with the present invention.

Referring now to the drawings and the illustrative embodiments depicted therein, a plant product extraction apparatus 10 is provided for separating a finer material from a larger portion of material or a mixture of different sizes of material, such as separating trichomes or herbal extracts from a flower, leaf, or stalk of a plant. The plant extraction apparatus 10 includes a plurality of motors or other oscillation/vibration devices to agitate a particle separation apparatus or separator, such as a sieve 20, in a plurality of vibratory/oscillatory modes or patterns. The separator may be a standard test sieve set having one or more sieves with varying mesh sizes or gradations to separate multiple material sizes, or any other suitable container to contain a material and to segregate, separate, grade, or sift off particles of material from the larger portion of material. The plant product extraction apparatus 10 may be configured for home use such as for table tops or workbench tops, or may be adapted for large scale applications.

For purposes of this disclosure, the term "oscillation" refers to a substantially defined repetitive motion along an expected path having a longer wavelength and/or a larger defined amplitude, i.e. linear back and forth sliding or shimmying, and the term "vibration" refers to a less defined repetitive motion having a potentially erratic path and having a shorter wavelength and/or a smaller defined amplitude, i.e. non-linear rapid shaking or constrained repetitive motion, such as may be provided by commonly known eccentric rotating mass motors or transducers, for example.

Figure 6:
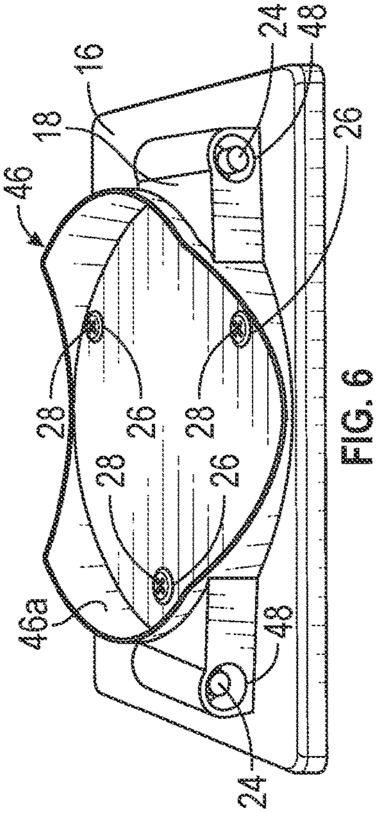
FIG. 6 is a perspective view of the sieve retention tray of FIG. 5 supported on a support platform.
Figure 7:
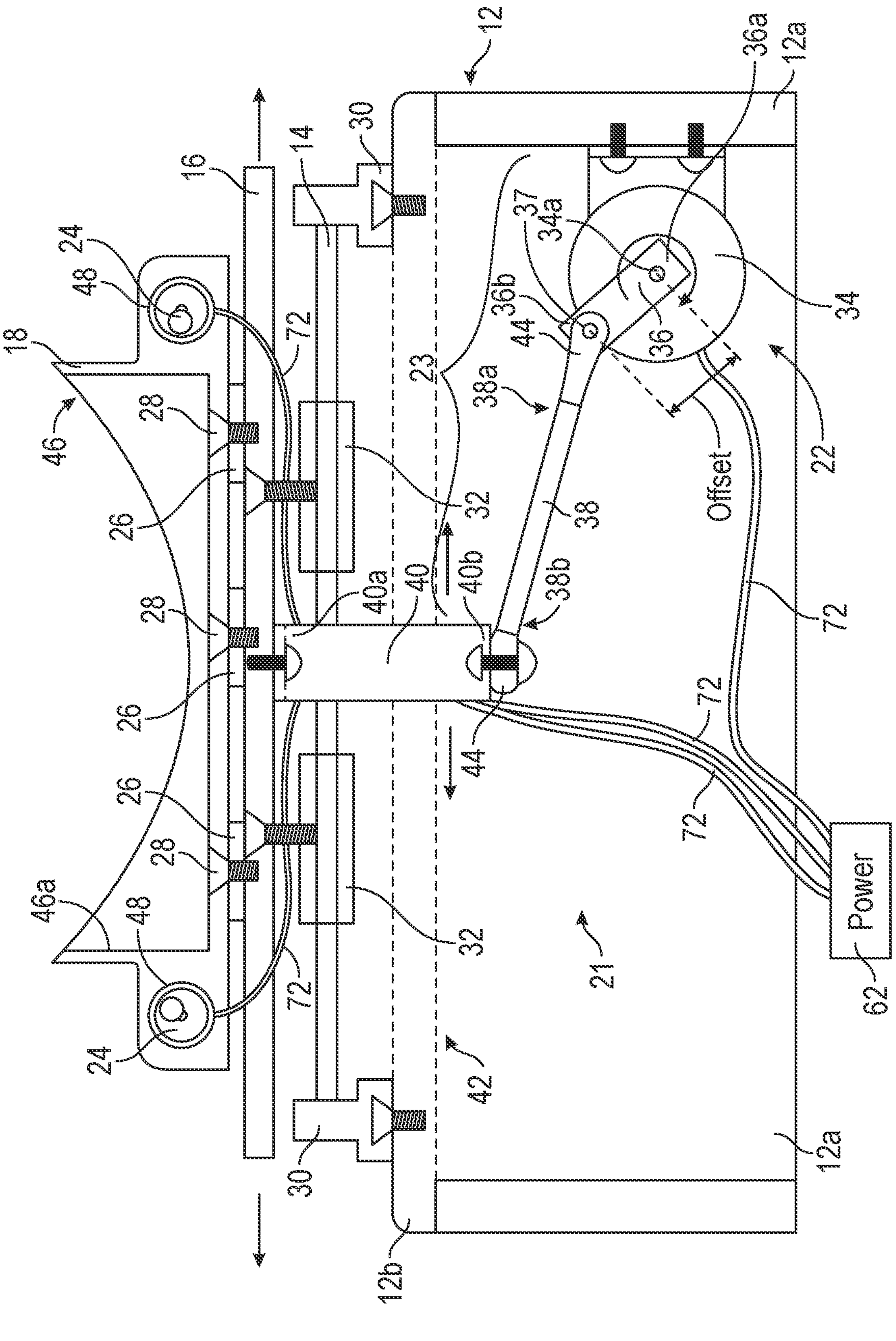
FIG. 7 is a front sectional view of the plant product extraction apparatus of FIG. 1, depicted with a sieve assembly omitted.
Figure 9:
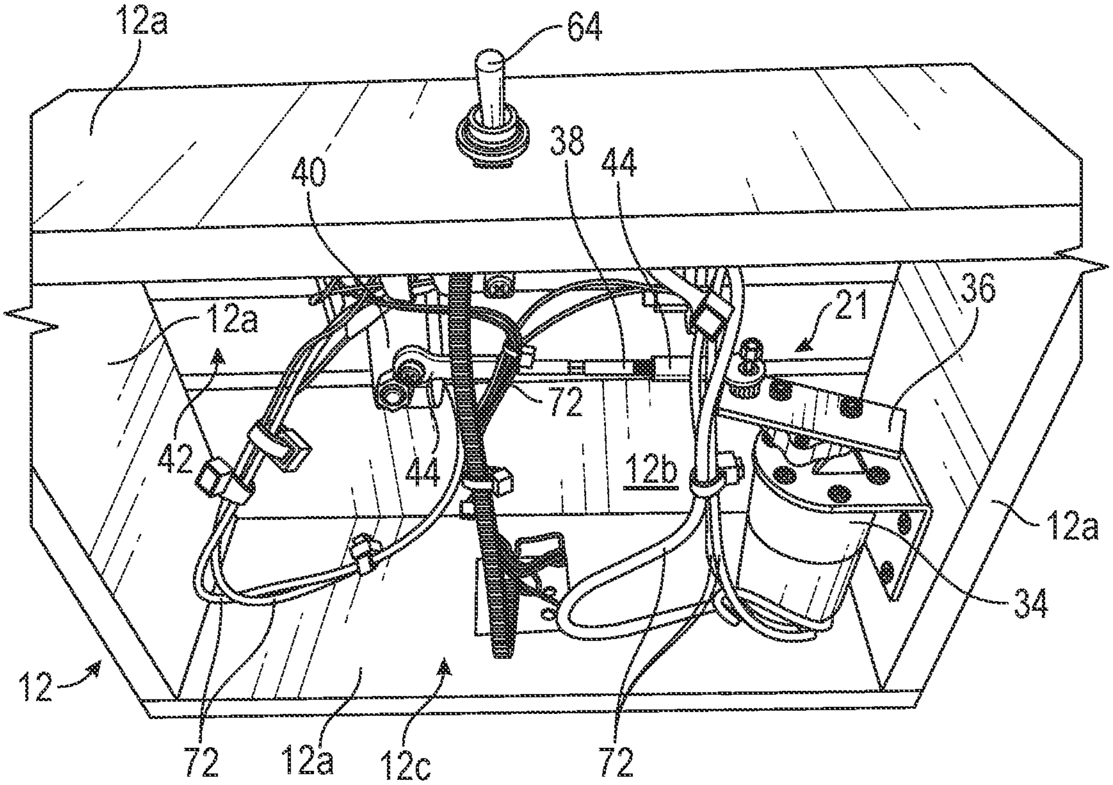
FIG. 9 is a bottom front perspective view of the extraction apparatus of FIG. 1.

In the illustrated embodiments of FIGS. 1-4, a plant product extraction apparatus 10 includes a support base 12, a pair of linear support or guide rails 14 coupled to the support base 12, a slidable support platform 16 that is slidable along the support rails 14, and a sieve retainer or retention tray 18 that is configured to retain a sieve 20 with respect to the support platform 16. The support platform 16 is configured to translate back and forth relative to the support base 12 to provide a back and forth oscillation to the sieve 20. A linear drive system 21 is provided to mechanically drive the support platform 16 back and forth along the support rails 14 (FIG. 7). The linear drive system 21 includes a motor assembly 22, such as an electric rotary motor, coupled to a linkage assembly 23. The motor assembly 22 and linkage assembly 23 cooperate to provide locomotion to the support platform 16 to drive the back and forth motion (FIGS. 7 and 9). A vibratory motor 24 is disposed with the sieve retainer tray 18 to impart a vibration to the sieve 20 (FIGS. 1-7). The vibratory motor 24 can impart a shaking vibration directly to the sieve retainer tray 18, including imparting vertical and horizontal vibration as a result of play (limited freedom of relative movement) due to clearances between the sieve retainer tray 18, the support platform 16, and mechanical fasteners 28 that secure the tray 18 to the platform 16. The motor assembly 22 and the vibratory motor 24 can be operated in unison to impart both back and forth oscillation and shaking vibration to the sieve 20 at the same time. Although a motor assembly and linkage assembly are disclosed, other reciprocal drivers are envisioned, such as a pneumatic or hydraulic piston-cylinder arrangement, linear electric actuators, or non-electric motors.

The support base 12 is defined by a rectangular box having four side walls 12*a*, a top 12*b*, and an open bottom 12*c* having a perimeter defined by the side walls 12*a* (FIGS. 1-4 and 8-10). The walls 12*a* and top 12*b* define a substantially hollow space or chamber inside of the base 12. The base top 12*b* supports the support rails 14. The motor assembly 22 and a portion of the linkage assembly 23 are housed within the chamber interior of the base 12. The support rails 14, as illustrated in FIGS. 1-4, 7, and 8, are coupled to the support base top 12*b* at rail end supports 30. The rails 14 are positioned in spaced arrangement, with each rail 14 being positioned proximate a respective side of the support base top 12*b*. The rail end supports 30 are mechanically fastened to the support base top 12*b* and provide sufficient clearance between the support base top 12*b* and the rails 14 to allow for substantially free back and forth movement of the support platform 16. The rails 14 define a linear oscillation path upon which the support platform 16 can be driven or guided back and forth to agitate the sieve 20.

The support platform 16 is slideably mounted on the support rails 14 by a plurality of slide mounts 32 (see FIGS. 1-3, 4, 7, and 8). Each slide mount 32 includes a through-hole through the mount 32 to receive the support rail 14, such that the support rail 14 passes through the through-hole. Each slide mount 32 is retained around the respective support rail 14 in the directions that are perpendicular to the longitudinal axis of support rail 14 while allowing the slide mount 32 to substantially freely slide parallel to the support rail 14. The slide mounts 32 are mechanically fastened to a bottom side of the support platform 16. Although the support rails 14 are shown horizontal in the illustrated embodiment, the rails may be inclined relative to horizontal, or they may be substantially vertical. While a pair of rails are shown and described, a single support rail may slideably support the support platform 16 relative to the support base 12. Although the illustrated embodiment discloses a linear oscillation path defined by the support rails, the oscillation path could be defined by curvilinear rails to guide the oscillation along a curvilinear path. Optionally, rollers may be provided to moveably support the support platform 16, instead of rails and slide mounts.

Figure 4:
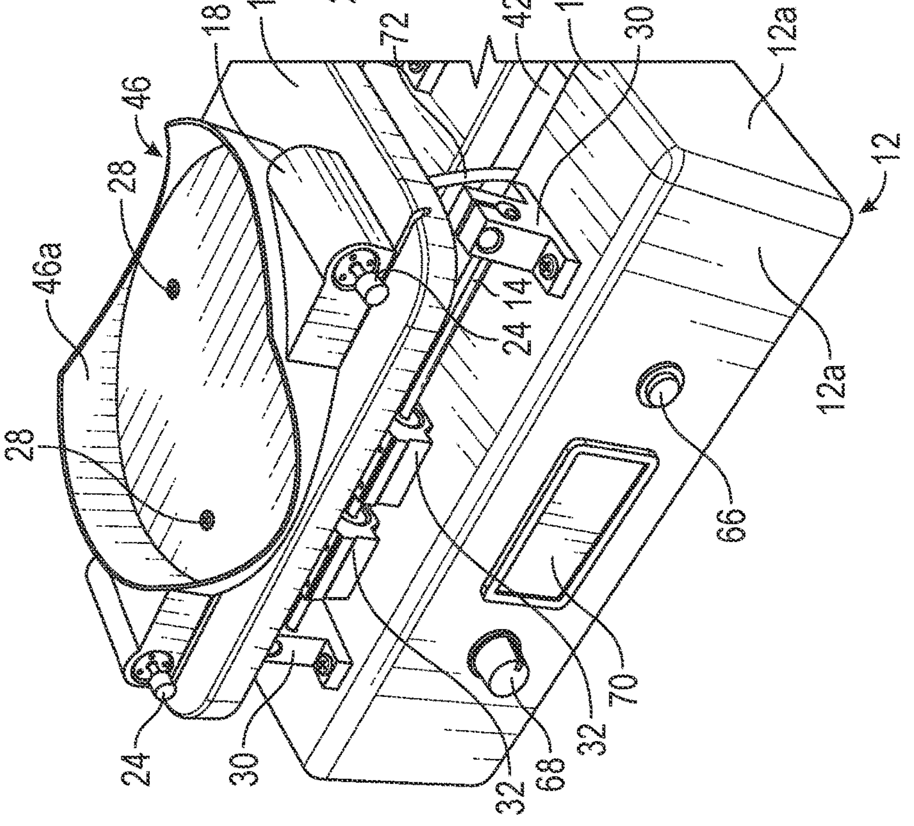
FIG. 4 is a front side perspective of another plant product extraction apparatus in accordance with the present invention.

The support platform 16 is formed of a sufficiently rigid material, such as wood, plastic, or metal, which is resilient to withstand repetitive oscillation while supporting the sieve retainer tray 18. The support platform 16 is defined by a substantially rectangular perimeter that is at least partially larger than the outer perimeter of the sieve retainer tray 18. Isolators 26, such as rubber bushings or washers, are disposed between the sieve retainer tray 18 and the support platform 16 (see FIG. 7), with mechanical fasteners 28 securing the tray 18 to the platform 16 (FIGS. 4 and 6). The isolators 26 are configured to permit limited movement of the sieve retainer tray 18 in a vertical direction and/or horizontal direction while reducing vibration transfer from the vibratory motor 24 through the sieve retainer tray 18 and into the support platform 16.

Figure 7A:
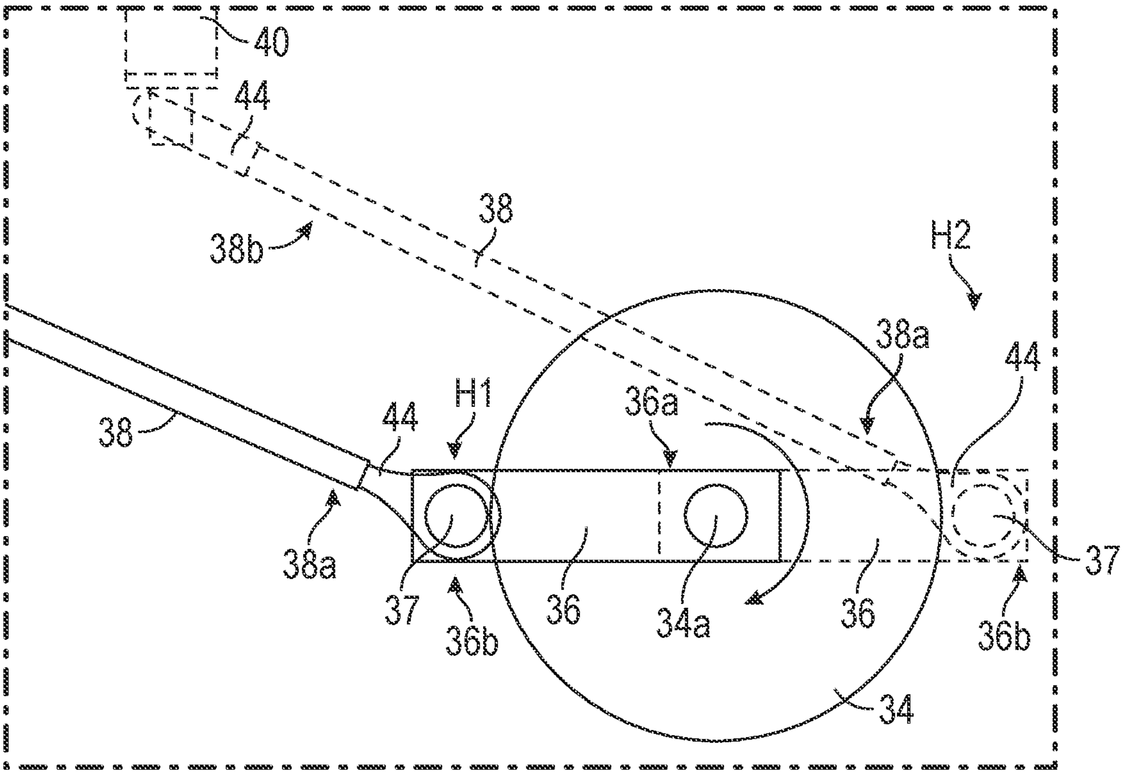
FIG. 7A is an enlarged sectional view depicting two possible operational positions of a rotary motor, gear arm, and drive arm during operation of the plant product extraction apparatus in accordance with the present invention.

As best shown in the illustrated embodiments of FIGS. 7 and 9, the linear drive system 21 includes a motor assembly 22 disposed within the support base 12, and a linkage assembly 23 that is disposed between the motor assembly 22 and the support platform 16. The linear drive system 21 is configured to mechanically drive a back and forth, linear horizontal oscillation of the support platform 16 relative to the support base 12. The motor assembly 22 includes a rotary motor 34 and a gear arm 36 that is fixed at a proximal end 36*a* to an output shaft 34*a* of the rotary motor 34 (FIGS. 7, 7A, and 9). During operation of the rotary motor 34, the output shaft 34*a* spins, causing the gear arm 36 to spin at the same rate of rotation as the output shaft 34*a*. As the gear arm 36 rotates the distal end 36*b* orbits around the rotational axis of output shaft 34*a*. The gear arm 36 provides an offset distance between the output shaft 34*a* and a connection pin 37 between the linkage assembly 23 and the gear arm 36 (FIGS. 7 and 7A). The offset distance is chosen as a function of the desired travel distance of the support platform 16. A longer offset distance will generate a longer longitudinal travel distance of the support platform 16, and vice versa.

Figure 8:
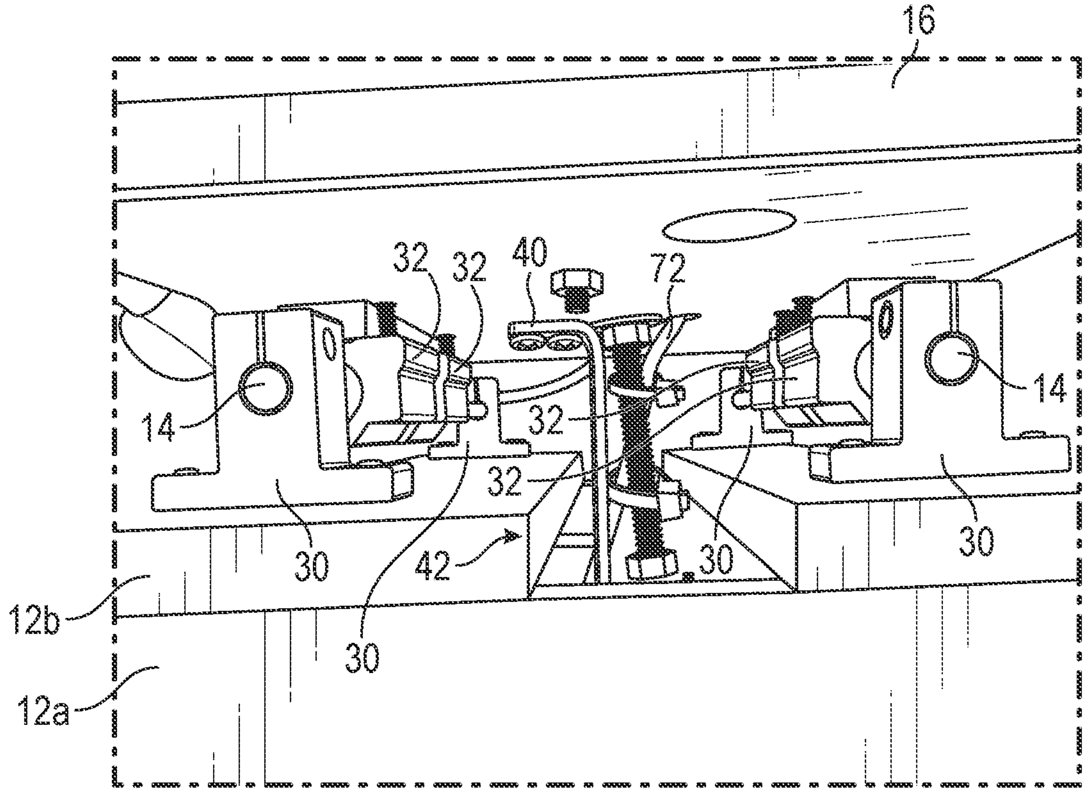
FIG. 8 is an enlarged perspective view of a platform support rail assembly for moveably supporting the platform of the extraction apparatus of FIG. 1.

The linkage assembly 23 includes a linkage drive arm 38 pivotally coupled at a first end 38*a* to the distal end 36*b* of the gear arm 36 and at a second end 38*b* to a distal end 40*b* of a vertical transfer arm 40 (FIGS. 7 and 7A). The proximal end 40*a* of the vertical transfer arm 40 is fixed to the support platform 16 and the transfer arm 40 is configured to transfer force from the linkage drive arm 38 to the support platform 16. The body of the vertical transfer arm 40 is disposed through an opening in the support base top 12*b* defined by a longitudinal slot 42 (FIGS. 7, 8, and 9). The longitudinal slot 42 is parallel to the support rails 14 and permits the transfer arm 40 to substantially freely travel back and forth horizontally within the slot 42. The drive arm 38 and the gear arm 36 cooperate to impart a reciprocating drive to the transfer arm 40. As illustrated in FIG. 7A, while the gear arm 36 orbits around the output shaft 34*a*, the proximal end 38*a* of the drive arm 38 is manipulated by the gear arm 36 at the connection pin 37. As the distal end 36*a* of the gear arm 36 is at one of its two maximum horizontal points of orbit (depicted respectively as H1 and H2 in FIG. 7A), the drive arm 38 is likewise at its respective maximum horizontal position. The distance between the maximum horizontal points of orbit of the gear arm 36 defines the longitudinal travel distance of the support platform 16. FIG. 7A depicts a first maximum horizontal position H1 of the gear arm 36 and drive arm 38 and a second maximum horizontal position H2, wherein position H2 is shown in phantom. In the illustrated embodiment of FIGS. 7, 7A, and 9, rod end bearings 44 are disposed at each end of linkage drive arm 38 to provide rotational connections between the gear arm 36, drive arm 38, and transfer arm 40 such that each end of the drive arm 38 is at least partially rotatable relative to the respective gear arm 36 or transfer arm 40.

The sieve retainer tray 18 has a generally cylindrical well 46 for retaining the sieve 20 in place on the platform 16 during oscillation of the platform 16 (FIGS. 4 and 6). The cylindrical well 46 is defined by a substantially vertical rim or wall 46*a* defining a circumference of the cylindrical well 46. While the wall 46*a* shown in the illustrated embodiments of FIGS. 1-6 is partially cut away on opposing sides of the tray 18, the wall 46*a* may be continuous and uninterrupted along the entire circumference of the well 46. The cylindrical well 46 is configured to receive and retain the lower portion of the sieve 20, wherein the inner diameter of the well 46 is at least slightly larger than the outer diameter of the sieve 20. The retainer tray 18 includes a pair of horizontal cylindrical cavities or sleeves 48 disposed at opposite ends of the tray 18, each sleeve 48 is configured to receive and retain a cylindrical vibratory motor 24. The perimeter of the tray 18 is sufficiently larger than the cylindrical well 46 such that the cylindrical sleeves 48 and vibratory motors 24 do not extend into the cylindrical well 46. The longitudinal axes of the cylindrical sleeves 48 and vibratory motors 24 as depicted in the illustrated embodiments of FIGS. 1-6 are horizontal and perpendicular to the support rails 14. However, the sleeves 48 may be oriented differently in other embodiments, such as parallel to the support rails 14 or at oblique angles relative to the support rails 14. Alternatively, the vibratory motors 24 may be coupled to an exterior portion of the retainer tray 18 and not disposed inside of a cavity in the tray 18. Optionally, vibratory motors may be coupled to the support platform 16 rather that the tray 18, or directly to the sieve 20. The integral relationship between the vibratory motors 24, cylindrical sleeves 48, and the retainer tray 18, facilitates vibratory motion transfer from the vibratory motors 24 into the retainer tray 18, and thereby to the sieve 20 to rapidly shake the sieve 20, to facilitate plant product separation.

It will be appreciated that the support platform 16 and/or retainer tray 18 may be omitted without substantially affecting the function of the apparatus 10. For example, the sieve 20 may be coupled directly to the slide mounts 32, the vibratory motors 24 may be coupled directly to a portion of the sieve 20, and the linkage assembly 23 may be coupled directly to a portion of the sieve 20. For another example, the retainer tray 18 may be coupled directly to the slide mounts 32 and the linkage assembly 23 may be coupled directly to a portion of the retainer tray 18.

Figure 10:
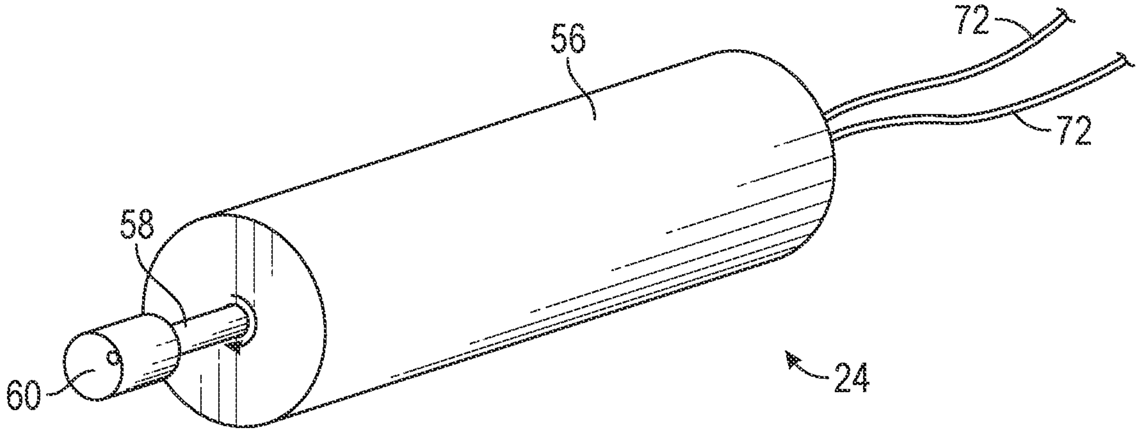
FIG. 10 is a perspective view of an eccentric rotating mass vibratory motor for the extraction apparatus of FIG. 1.

The vibratory motors 24 are cylindrical eccentric rotating mass motors, or coreless vibration motors, having a rotary motor 56 that spins a longitudinal drive shaft 58 (FIG. 10). An eccentrically mounted or off-center mass or weight 60 is disposed on the distal end of the drive shaft 58, wherein as the drive shaft 58 spins, the eccentrically mounted mass 60 causes an asymmetric centripetal force that is transferred to the drive shaft 58 and causes a vibration that acts substantially perpendicular to the longitudinal axis of the cylindrical motor 24. The vibration driven by the vibratory motors 24 can transfer to the retainer tray 18 in all directions that are substantially perpendicular to the longitudinal axis of the vibratory motors 24. As depicted in FIGS. 1-7, the vibration from the vibratory motors 24 would be directed perpendicular to the support rails 14 and in all directions horizontally, vertically, and obliquely depending on the orbit of the eccentric mass 60 relative to the drive shaft 58.

Figure 2:
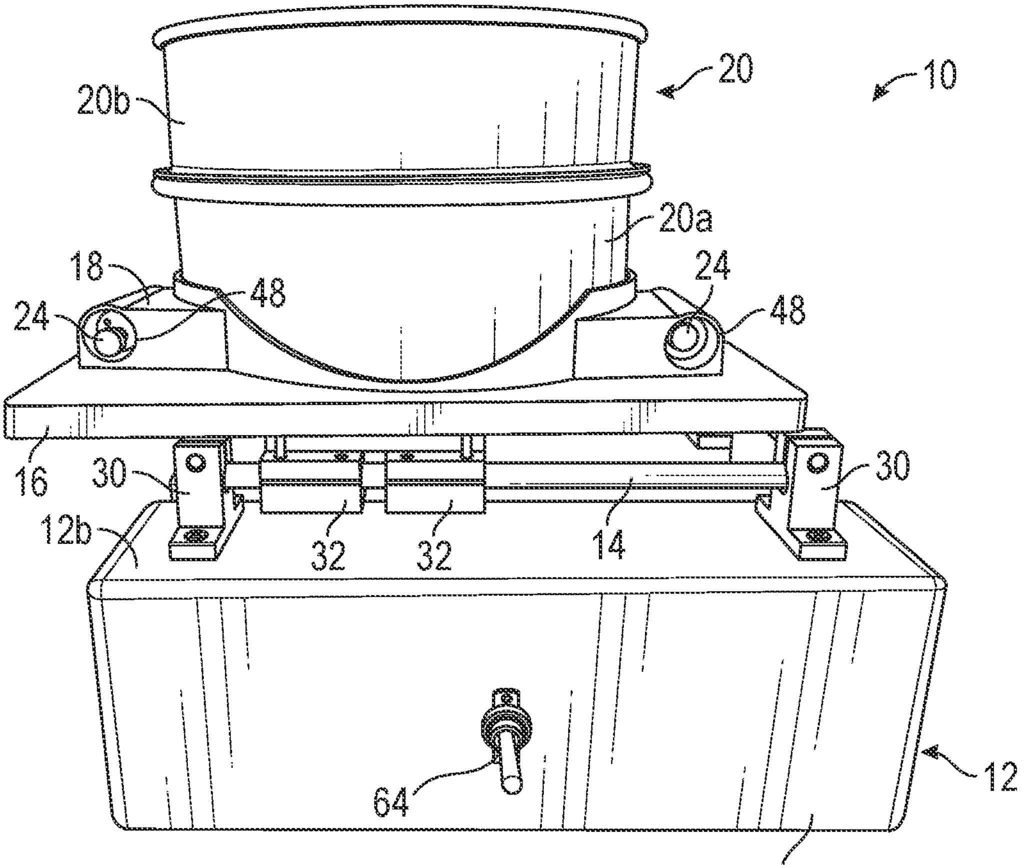
FIG. 2 is another front perspective view of the extraction apparatus of FIG. 1, depicting a support platform situated to a side of the apparatus.
Figure 3:
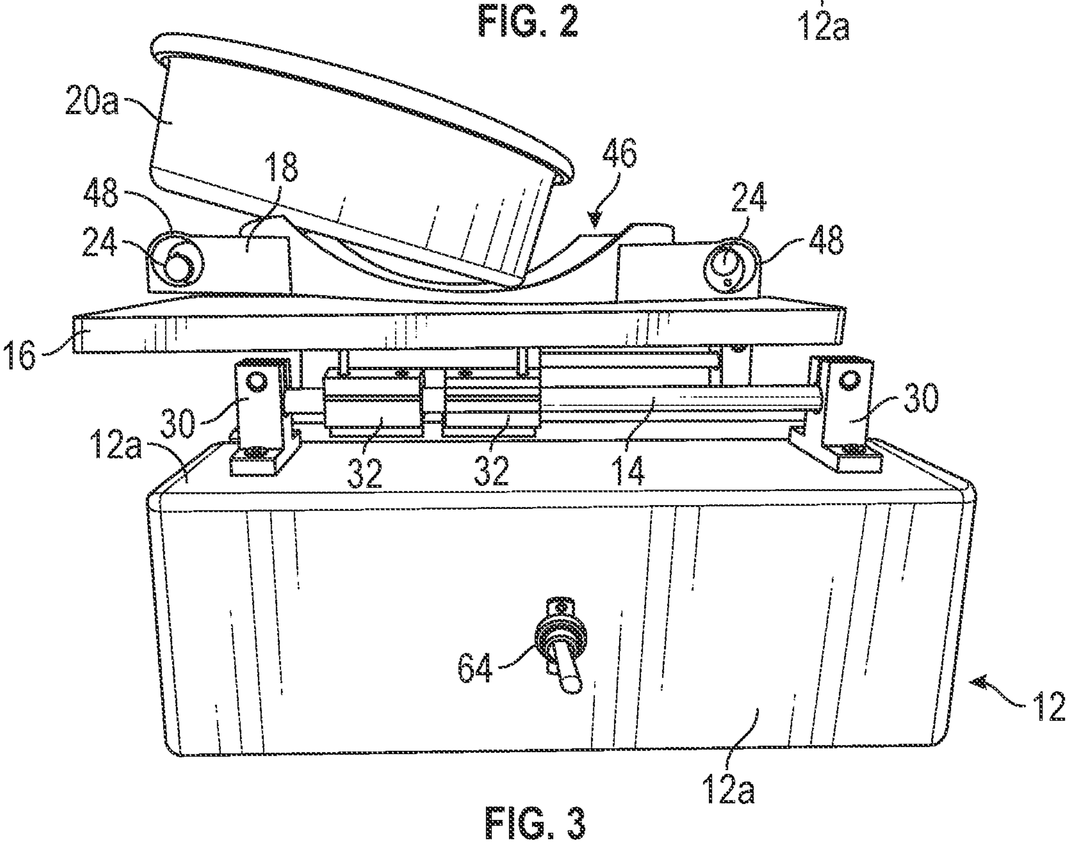
FIG. 3 is another front perspective view of the extraction apparatus of FIG. 1, depicting the support platform situated to a side of the apparatus and a plant matter tray partially removed from a sieve retention tray.
Figure 5:
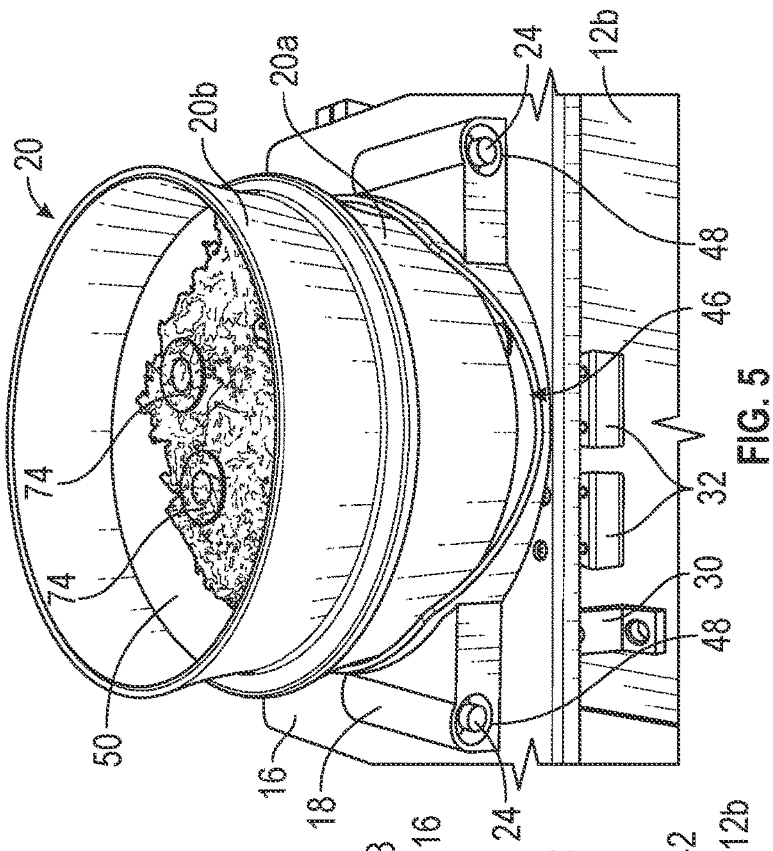
FIG. 5 is a perspective view of a sieve assembly and a sieve retention tray of the extraction apparatus of FIG. 1, depicting plant matter contained in a portion of the sieve assembly.

In the illustrated embodiments of FIGS. 1, 2, and 5, the plant product extraction apparatus 10 supports and agitates a sieve 20 that is defined by a standard test sieve that includes a lower collection pan 20*a* and an upper sieve pan 20*b*. The upper sieve pan 20*b* includes a mesh screen 50 disposed along a bottom opening of the sieve pan 20*b* to sift or grade the plant material (FIG. 5). The mesh screen 50 is chosen as a function of the size of the plant product or material that a user is intending to extract from the larger portion of the plant. As the plant product extraction apparatus 10 agitates the sieve 20, the plant material inside the upper sieve pan 20*b* is agitated along the mesh screen 50 such that particles smaller than the openings in the mesh screen 50 pass through the screen 50 and fall into the collection pan 20*a*. Material that remains larger than the openings in the mesh screen 50 remain inside the upper pan 20*b* above the screen 50. A cover 52 may be placed over the upper pan 20*b* to retain material inside the sieve 20 during operation of the apparatus 10 (FIG. 1). The cover 52 and each portion of the sieve 20 is removable to add, remove, or manipulate the plant matter in a respective portion of the sieve 20. The upper pan 20*b* and/or screen 50 must be removed to access the sifted plant matter from the lower collection pan 20*a*. Optionally, additional upper sieve pans may be included with the sieve 20, the additional sieve pans having varying sizes of mesh screens in order to grade different sizes of plant material. A sieve retention element 54 may be included to further retain the sieve 20 within the retainer tray 18 during operation of the apparatus 10 (FIG. 1). The retention element 54 may be a strap or a bungee cord coupled at each end to a portion of the retainer tray 18 and disposed over the top of the sieve 20, although other retention elements such as clips or threaded connections or fasteners are also envisioned.

A power source 62 provides electric power to the plant product extraction apparatus 10, including the rotary motor 34 of the motor assembly 22 and the rotary motor 56 of each vibratory motor 24 (FIG. 7). A power switch or control, such as a toggle switch 64 (see FIGS. 1-3), a button 66, and/or an adjustable dial 68 (see FIG. 4), is provided to enable, interrupt, or adjust the flow of electricity from the power source 62 to the apparatus 10. The adjustable dial 68 provides for voltage adjustment to increase or decrease the voltage supplied to the motors 34 and 56 to increase or decrease the speed of the motors. A display screen 70 is provided to display information to a user (FIG. 4), such as the voltage level based on the position of the adjustable dial 68 or a timer displaying a countdown of time left for operation. A plurality of wires 72 are routed through the plant product extraction apparatus 10 to distribute electricity to the motor assembly 22 and the vibratory motors 24 (FIGS. 7 and 9). Slack or excess length in the wires 72 may be provided to allow the wires 72 coupled to the vibratory motors 24 to move along with the support platform 16 as the apparatus 10 is being operated. The wires 72 are positioned such that they do not interfere or inhibit operation and locomotion of the extraction apparatus 10.

The plant product extraction apparatus 10 may include a plurality of free agitators 74 disposed within the sieve 20 to facilitate separation of the finer material from the plant by agitating the material inside the sieve 20 as the apparatus 10 is operated (FIG. 5). In the illustrated embodiment of FIG. 5, the agitators 74 are defined by circular metal plates, such as metal washers, however other shapes and materials may be define the agitators 74, such as balls or non-circular shapes. The agitators 74 rest on top of the screen 50 and are free to slide or translate within the upper sieve pan 20*b*. The agitators 74 contact and interact with the plant matter above the screen 50 to facilitate separation of the finer material from the large plant matter. The multiple modes/types of oscillation and/or vibration provided by the linear drive assembly 21 and the vibratory motors 24, along with the multiple agitators 74, cooperate to facilitate the separation of smaller particles from a larger plant specimen through the sieve screen 50.

Figure 11:
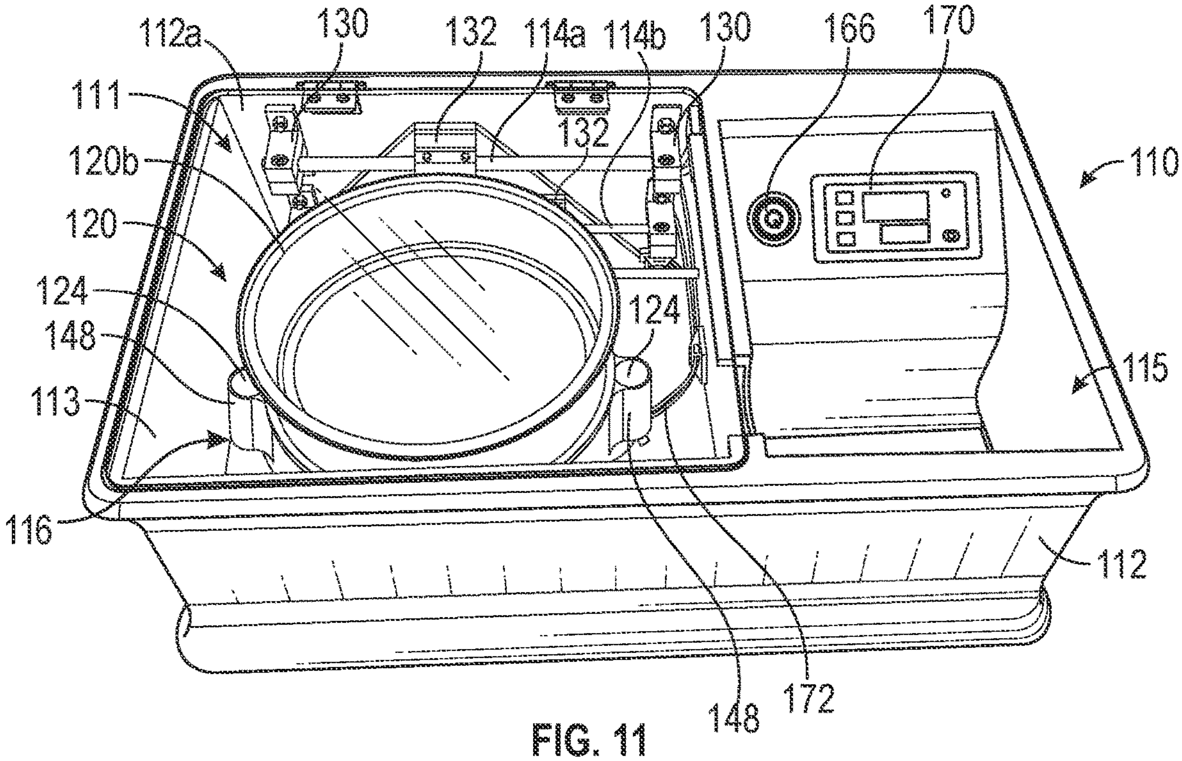
FIG. 11 is a top front perspective view of another plant product extraction apparatus in accordance with the present invention.
Figure 12:
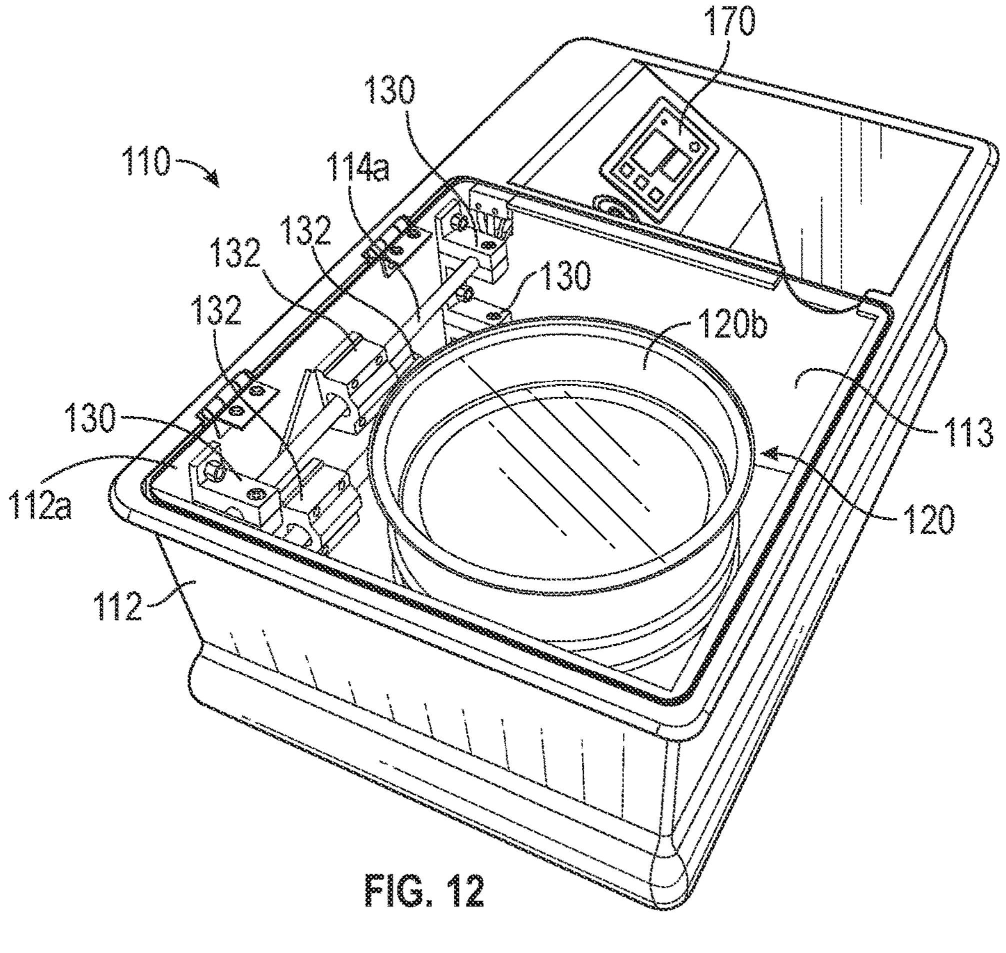
FIG. 12 is a top side perspective view of the plant product extraction apparatus of FIG. 11.

Referring to the illustrated embodiment of FIGS. 11-12, another plant product extraction apparatus 110 is similar to apparatus 10 in many respects and includes many similar structures to perform substantially similar functions. Significant differences between apparatus 110 and apparatus 10 are discussed further herein. Support rails 114*a*, 114*b* of apparatus 110 are mounted via rail end supports 130 to one side wall 112*a* of a support base 112 such that an upper one of the rails 114*a* is aligned substantially above the other or lower rail 114*b*. A plurality of slide mounts 132 are provided to support a sieve support 116 (FIG. 11), such as in the form of a platform, sieve retention platform or tray, and/or a sieve apparatus 120. For example, a single slide mount 132 may be provided along the upper rail 114*a* and a pair of slide mounts 132 may be provided along the lower rail 114*b*. The rails 114*a*, 114*b* define a linear oscillation path upon which the sieve support 116 and/or sieve apparatus 120 can be driven back and forth to agitate the sieve apparatus 120. The sieve support 116 of apparatus 110 may be, for example, a circular tray (similar to that of retention tray 18 of apparatus 10) or a rigid hoop or ring that is dimensioned to receive and retain a lower portion of the sieve apparatus 120. It will be appreciated that the sieve support 116 may be formed similar to the support platform 16 of apparatus 10, the sieve retention tray 18 of apparatus 10, or a combination or assembly of a support platform and sieve retention tray similar to platform 16 and tray 18 of apparatus 10. It will also be appreciated that the sieve support 116 may be omitted and the sieve apparatus 120 may be coupled directly to the slide mounts 132 without adversely affecting the oscillatory function of the apparatus 110. Support rails 114*a* and 114*b* function substantially similar to rails 14 discussed above for apparatus 10, and, as described previously, one of the rails 114*a* or 114*b* may be omitted without substantially affecting the operation of the apparatus 110.

Similar to vibratory motors 24 of apparatus 10, a pair of vibratory motors 124 are provided with apparatus 110 to impart a shaking vibration directly to the sieve support 116 and/or sieve apparatus 120 (FIG. 11). The vibratory motors 124 are disposed in vertical cylindrical cavities or sleeves 148 at generally opposite sides of the sieve support 116 or the sieve apparatus 120 (FIG. 11). The apparatus 110 includes a motor assembly or drive mechanism to provide locomotion to the sieve support 116 or sieve apparatus 120 to drive the sieve apparatus 120 in a back and forth motion relative to the rails 114*a*, 114*b*. Similar to that described above for apparatus 10, the motor assembly of apparatus 110 and the vibratory motors 124 can be operated simultaneously to impart both back and forth oscillation and shaking vibration to the sieve apparatus 120 at the same time. For aesthetic, safety, or other purposes, the motor assembly may be disposed in a covered portion of the support base 112 to protect the motor assembly from damage and/or to reduce or eliminate the possibility of injury to the user during operation of the apparatus 110. A linkage assembly may be provided between the motor assembly and the sieve support 116 of apparatus 110, similar to the linkage assembly 23 of apparatus 10 as described above. The linkage assembly for apparatus 110 may include an arm or element that is disposed through an opening or gap defined in the support base 112 to drive the sieve support 116 while the motor assembly is disposed in a covered portion of the support base 112.

The support base 112 of apparatus 110 includes a hollow or open operation chamber 111 in which most, if not all, moving parts of the apparatus 110 are disposed, including the rails 114*a*, 114*b*, sieve support 116, and sieve apparatus 120 (FIGS. 11-12). The hollow chamber 111 allows the moving parts of the apparatus 110 to be protected within the envelope of support base 112. In other words, users of the apparatus 110 are protected from the moving parts of the apparatus because the moving parts are all disposed within the chamber 111. As such, the operation movements of the apparatus 110 are confined within an envelope defined by the chamber 111 and the overall volumetric perimeter of the support base 112. A lid or cover 113 is hingedly coupled to the support base to cover the hollow chamber 111 to provide additional safety precautions to reduce or eliminate the possibility of a user inserting a body part into the chamber 111 and becoming injured by the operation of the apparatus 110.

A hollow or open control chamber 115 is formed in a portion of the support base 112 adjacent to the operation chamber 111 (FIGS. 11-12). An on/off switch or button 166 and a display screen 170 are mounted in the control chamber 115. The on/off button 166 and display screen 170 may function in similar fashion to button 66 and screen 170 of apparatus 10 as described above. The display screen 170 be multi-functional and may include buttons, switches, touchscreens, or the like, to control various functions of the apparatus 110. For example, the display screen 170 interface may allow a user to alter the operation or function of the motor assembly and the vibratory motors 124 independent of one another, or in combination with one another, to impart different oscillatory/vibration patterns to the sieve apparatus 120. Similar to wires 72 of apparatus 10, apparatus 110 includes a plurality of wires 172 routed through the plant product extraction apparatus 110 to distribute electricity to the motor assembly and the vibratory motors 124. A cover, similar to cover 52 of apparatus 10, may be placed over the upper pan 120*b* to retain material inside the sieve apparatus 120 during operation of the apparatus 110.

Figure 13:
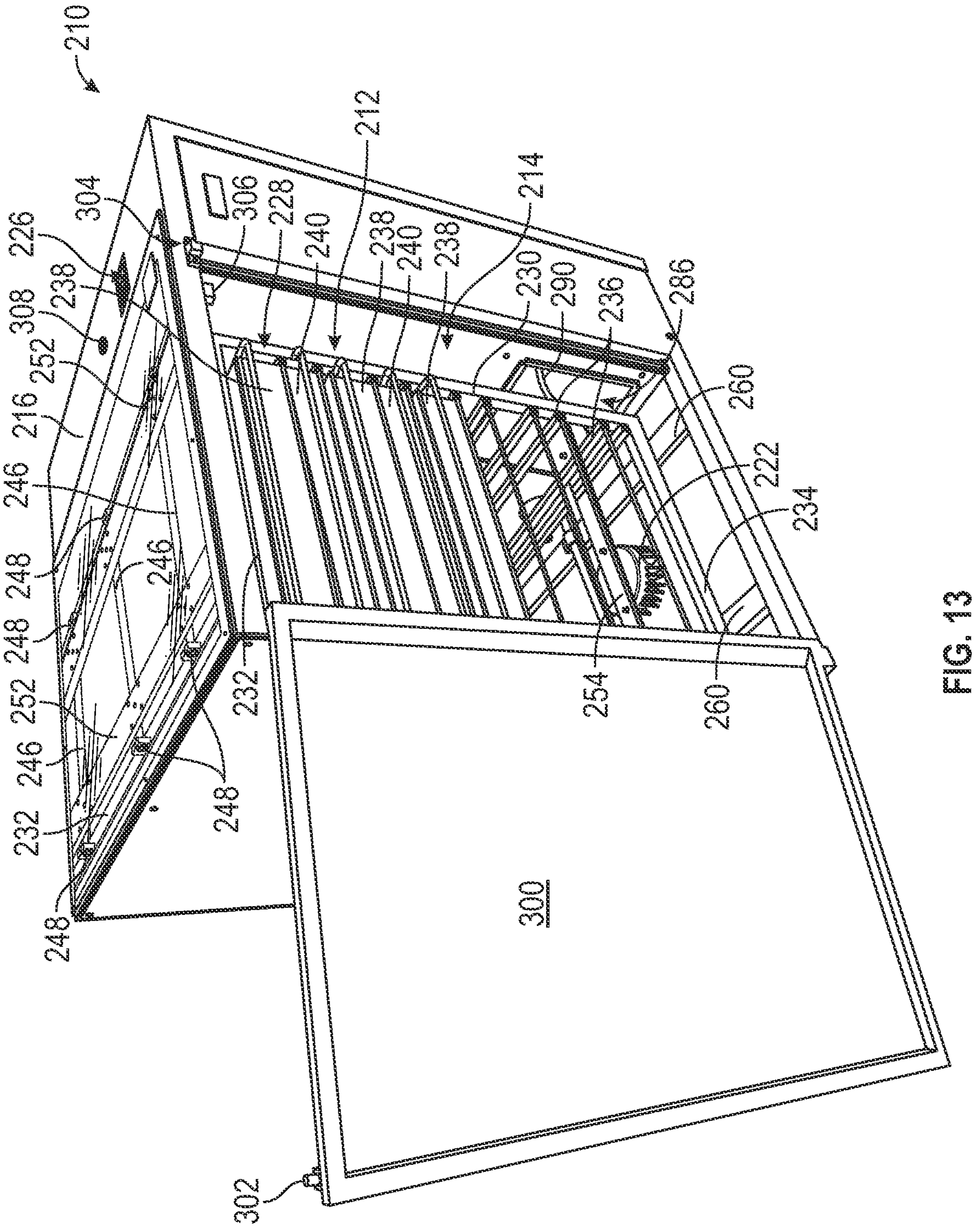
FIG. 13 is a front perspective view of another plant product extraction apparatus in accordance with the present invention, shown with access door opened.

It will be appreciated that extraction apparatuses may be scaled up to provide faster and/or higher-volume sifting, such as the high volume plant product extraction apparatus 210 of FIGS. 13-18. Extraction apparatus 210 includes a support platform in the form of a sifting carriage 212 mounted in a sifting chamber 214 defined by a cabinet or housing 216 (FIG. 13). As will be described in more detail below, sifting carriage 212 is mounted in such a way as to allow simultaneous side-to-side oscillating motion imparted by an oscillation motor 218 (FIG. 15), vibration imparted by a vibratory motor 220 (FIGS. 14, 16, and 17), and a haptic transducer 222 (FIG. 13) for imparting higher frequency vibrations in the sonic range of about 20 Hz to 20 kHz. The operation of motors 218, 220 and transducer 222 is directed by a controller 224 (FIG. 15), which receives inputs from a timer 226 (FIGS. 13 and 18) and de-energizes motors 218, 220 and transducer 222 when a desired amount of operation time (set on timer 226) has elapsed.

Sifting carriage 212 is made up of a box-like frame 228 having four upright posts 230, four upper frame pieces 232 coupled to the upper ends of the upright posts 230, and four lower frame pieces 234 coupled to the lower ends of the upright posts 230. A series of channel rails 236 extend front-to-back between the pairs of upright posts 230 along either side of frame 228, in vertically-spaced arrangement. Each corresponding pair of channel rails 236 receives a set of particle separators in the form of sifting trays or screen boxes 238, alternating with catch pans 240 in vertically-stacked arrangement, so that materials placed in the screen boxes 238 can pass small particles into the respective catch pans 240. Mesh screens 241 make up the lower panel of each screen box 238 (FIG. 20), and may be replaceable so that the mesh size may be changed, or to substitute a cleaned or undamaged screen as needed. The mesh size of each screen may be substantially any desired mesh, and in the case of separating trichomes from other plant matter, the desired mesh size may be about 120 microns. For other sifting operations, mesh sizes from 25 micro (or below) to 250 micron (or above) are envisioned, such as to allow for collection of different types or grades of material from a supply of biomass. Catch pans 240, screen boxes 238, and the screens themselves may all be made from stainless steel or other strong and corrosion-resistant material. Optionally, lower regions of screen boxes may be configured to "nest" into upper regions of catch pans by sizing the screen boxes' lower regions slightly smaller than their upper regions, allowing corresponding screen box and catch pan sets to be handled together as a unit until an operator wishes to separate them. In that case, a single pair of support rails may be used to hold a box/pan set.

Figure 14:
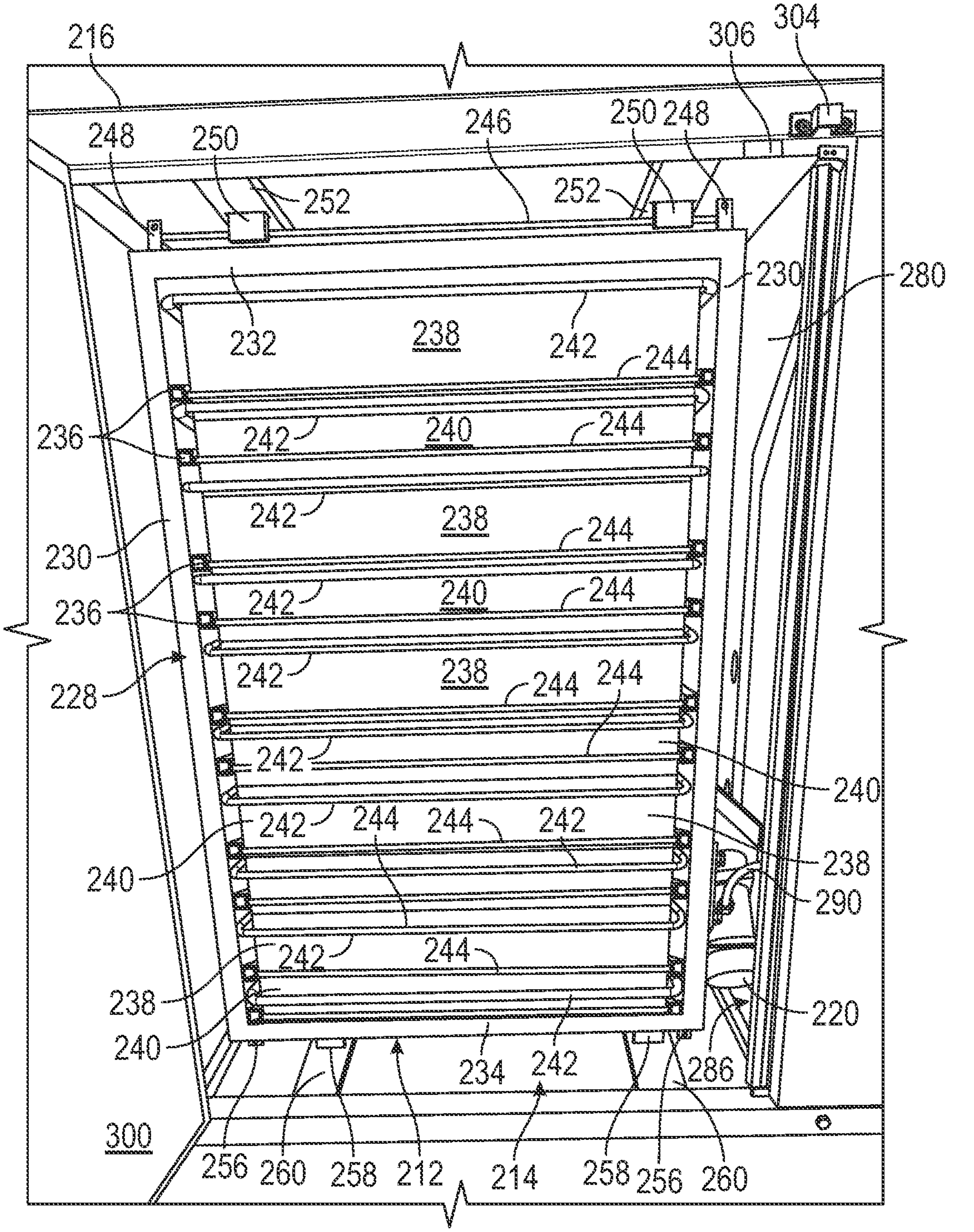
FIG. 14 is a front perspective view of a sifting chamber of the apparatus of FIG. 13.
Figure 18:
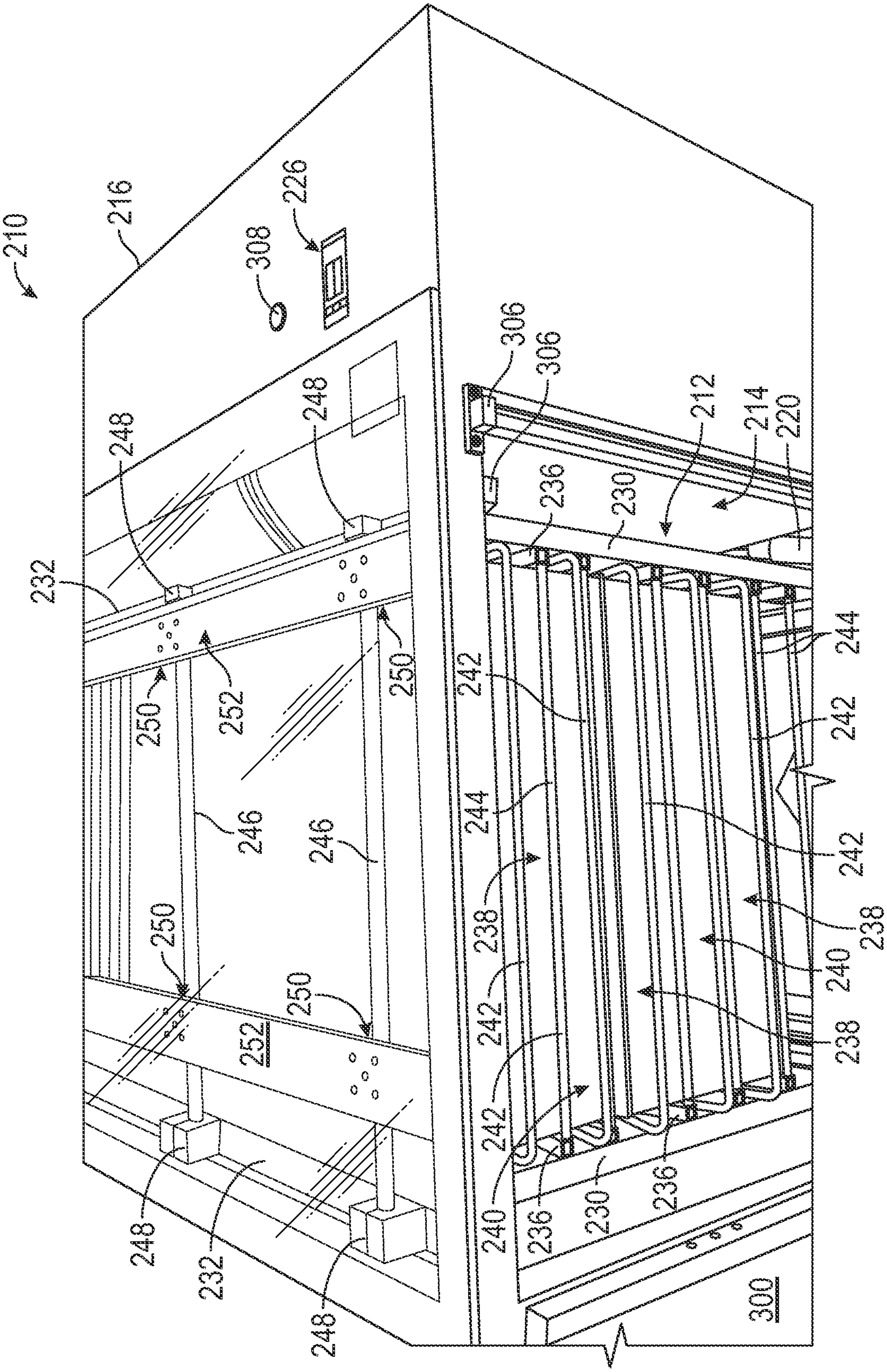
FIG. 18 is an enlarged front perspective view of an upper region of the apparatus of FIG. 13.

In the illustrated embodiment and as best shown in FIGS. 14 and 18, there are five sets of screen boxes 238 and corresponding catch pans 240. It will be appreciated that frame 228 may be loaded with fewer sets of screen boxes and catch pans if desired, and it will further be appreciated that the frame 228 and/or screen boxes 238 and catch pans 240 may be scaled in size to allow for substantially any desired number and sizes of screen boxes and catch pans to be accommodated. All screen boxes 238 and catch pans 240 may be interchangeable or repositionable along frame 228 as desired by the operator. Each screen box 238 and each catch pan 240 includes a front grab rail 242 to facilitate installation and removal from the channel rails 236. An optional front retainer rail 244 extends between the front end portions of corresponding channel rails 236, and serves to retain the screen box 238 or catch pan 240 in place until an operator grasps the front grab rail 242 to slightly lift up the forward portion of the screen box or catch pan so that it can be slid out over retainer rail 244. After operation of high volume plant product extraction apparatus 210, screen boxes 238 and/or catch pans 240 may be removed as desired to remove the sifted materials from catch pans 240, to replace the plant matter remaining in screen boxes 238, to clean the components, or change out mesh screens 241, for example. By using multiple screen boxes 238 and catch pans 240 in a single sifting carriage 212, extraction apparatus 210 can be used to simultaneously sift multiple smaller batches of the same materials, or to sift batches of different materials (e.g., biomass from wholly different plants, different strains of the same plant group, wholly different materials, etc.) in the different screen boxes 238. Another option is to sift loose biomass in the uppermost screen box 238 using the coarsest desired mesh screen, and then use progressively finer mesh screens with each screen box below so that the particles from each catch pan 240 can be moved to the next screen box 238 after each sifting cycle. Such operation would allow for sorting of different grades of particles by size, while maximizing production from a given amount of initial biomass because larger particle sizes are permitted to pass through the initial mesh screen(s). In addition, screen box 238 and their corresponding catch pans 240 can be swapped out as sets as desired, simply by pausing or ending an agitation cycle.

Figure 16:
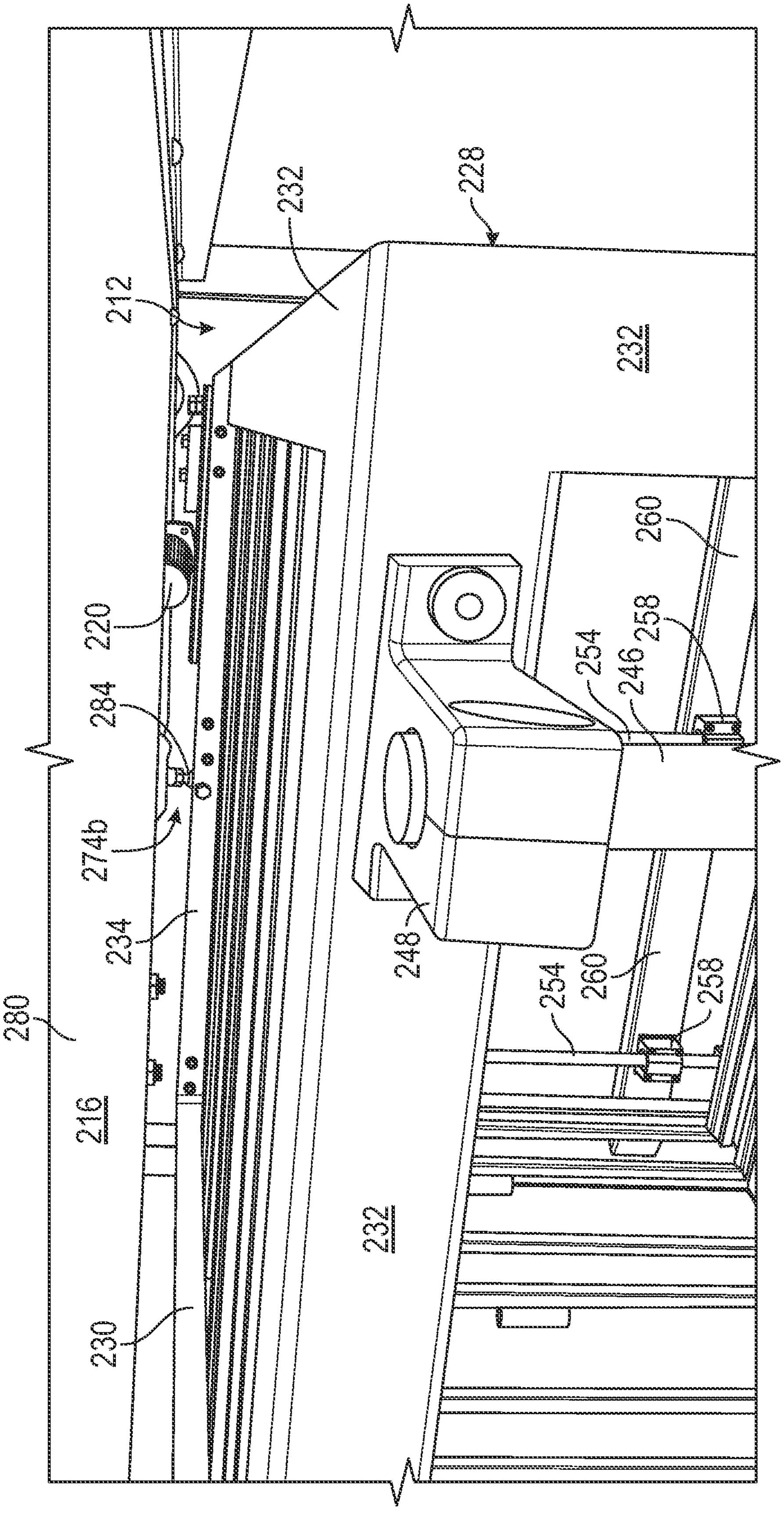
FIG. 16 is a top perspective view of a side portion of the sifting carriage in the sifting chamber of the apparatus of FIG. 13.
Figure 17:
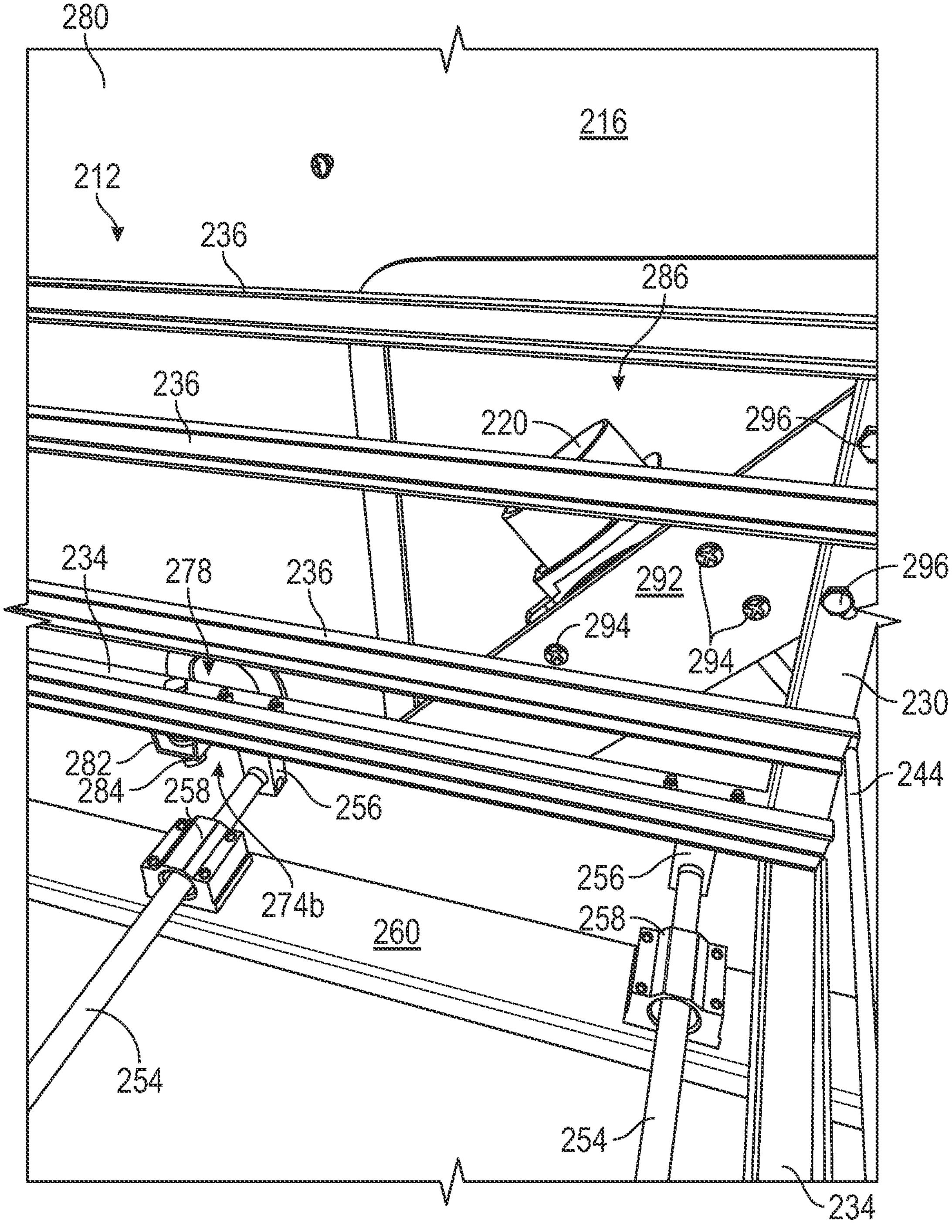
FIG. 17 is a perspective view taken from an interior of the sifting carriage and looking outboard to a vibration motor of the apparatus of FIG. 13.

Frame 228 is movably supported above upper frame pieces 232 by a set of upper rails 246 that are set parallel to one another in a spaced side-by-side arrangement. Opposite ends of each upper rail 246 are coupled to respective upper frame pieces 232 by upper mounting blocks 248. Each upper rail 246 is slidably received in a pair of linear bearings 250 that are mounted to the undersides of upper support beams 252 that extend along an upper region of sifting chamber 214. Frame 228 is further supported below lower frame pieces 234 in substantially the same manner that it is supported above upper frame pieces 232. A set of lower rails 254 are set parallel to one another in a spaced side-by-side arrangement (FIGS. 13, 16, and 17). Opposite ends of each lower rail 254 are coupled to respective lower frame pieces 234 by lower mounting blocks 256. Each lower rail 254 is slidably received in a pair of linear bearings 258 that are mounted to upper surfaces of lower support beams 260 that extend along a lower region of sifting chamber 214. Lower rails 254 in linear bearings 258, and upper rails 246 in linear bearings 250, support sifting carriage 212 with screen boxes 238 and catch pans 240 as they oscillate laterally (left-to-right and vice versa, as viewed in FIGS. 14 and 18). The oscillating motion of sifting carriage 212 thus follows along a support rail path defined by upper and lower rails 246, 254.

Figure 15:
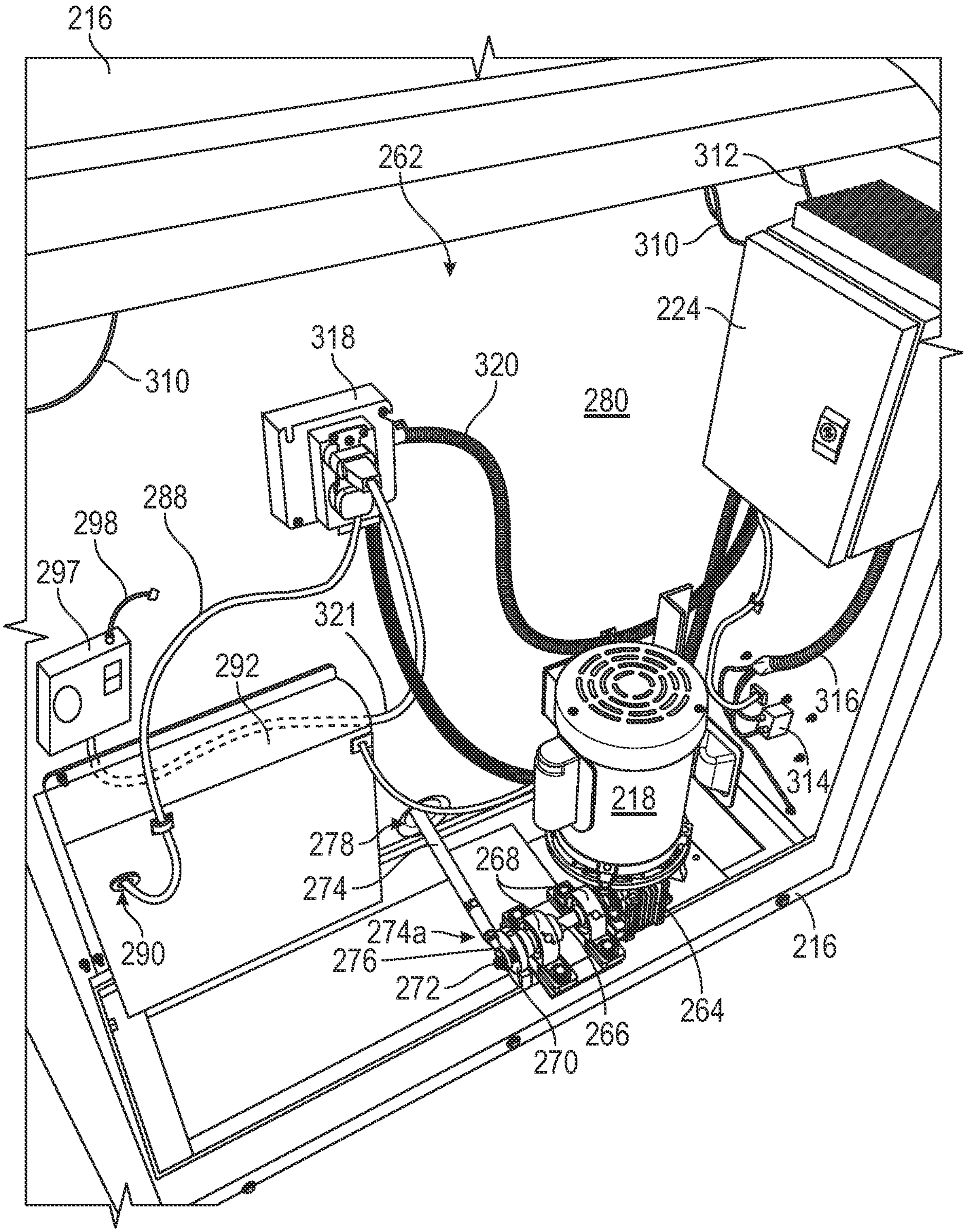
FIG. 15 is a side perspective view of the apparatus of FIG. 13, shown with a cover panel removed to show internal structure.

The lateral oscillating motion of sifting carriage 212, along a support rail path defined by upper and lower rails 246, 254, is driven by oscillation motor 218, which is mounted in a side chamber 262 of cabinet 216, as shown in FIG. 15. In the illustrated embodiment, oscillation motor 218 is mounted at a lower region of side chamber 262 with a vertically-oriented output shaft received in a gearbox 264. Gearbox 264 has a horizontal output shaft 266 that is supported by a pair of pillow block bearings 268. Output shaft 266 may be coupled to a toothed wheel (gear) inside gearbox 264, the gear being driven by a spiral thread (worm) on the output shaft of the oscillation motor 218. A distal end of the output shaft 266, opposite gearbox 264, is fitted with a drive wheel 270 having an off-center coupling 272, such as a spherical rod-end ball. A linkage in the form of a reciprocating shaft 274 has a coupler 276 (such as a female spherical rod-end coupler) at its proximal end 274*a*, which is attached to off-center coupling 272. Reciprocating shaft 274 passes through an opening 278 that is formed in a divider wall 280 separating side chamber 262 from sifting chamber 214. A distal end 274*b* of reciprocating shaft 274 is coupled to sifting carriage 212 in sifting chamber 214, such as shown in FIGS. 16 and 17. A right-side lower frame piece 234, closest to divider wall 280, is fitted with a bracket 282 that supports another spherical rod-end ball, which in turn receives another female spherical rod-end coupler 284 at distal end 274*b* of reciprocating shaft 274. Optionally, an adjustable gear ratio may be provided via a gearbox, continuously-variable transmission, or the like, to allow for different oscillation speeds for a given speed of oscillation motor 218. The final drive ratio of output shaft 266 to the output speed of motor 218 may be user-selectable by machine controls or other means of adjusting the gear ratios, in addition to the option of changing motor speed.

Oscillation motor 218 thus drives sifting carriage 212 in a lateral side-to-side motion, which lower rails 254 sliding through linear bearings 258 and upper rails 246 sliding through linear bearings 250. Oscillation motor 218 may operate at a fixed voltage and speed, or its speed may be adjusted by controller 224 varying the voltage supplied to motor 218, to change the oscillation frequency. The lateral oscillation amplitude may be changed by replacing drive wheel 270 with a larger or smaller drive wheel, and/or by moving the drive wheel's off-center coupling 272 radially inward or outward relative to the drive wheel's axis of rotation. It will be appreciated that the lateral oscillation amplitude is limited to the difference between the overall width of the sifting chamber 214 compared to the overall width of the sifting carriage 212. Optionally, a narrower sifting carriage may be installed if a greater oscillation amplitude is desired. It is further envisioned that an adjustable-width sifting carriage may be provided using telescoping frame pieces in the lateral direction, and screen boxes 238 and catch pans 240 of different widths, to facilitate different desired oscillation amplitudes within the same size of sifting chamber 214.

As noted above, vibratory motor 220 imparts lower-amplitude vibrations to sifting carriage 212 than oscillation motor 218, and is coupled to the right side of sifting carriage 212 as shown in FIGS. 14 and 16-18. A recessed chamber 286 is formed in divider wall 280 and provides clearance for vibratory motor 220 as sifting carriage 212 oscillates to the right (toward divider wall 280). Power wiring 288 for vibratory motor 220 passes through an opening 290 formed in a box structure 292 that defines recessed chamber 286. Power wiring 288 is sufficiently flexible and wear-resistant, with sufficient excess length provided so that its end closest to vibratory motor 220 may oscillate with vibratory motor 220 and sifting carriage 212 without causing significant wear or fatigue to the power wiring 288, and without moving the power wiring 288 through opening 290 as carriage 212 oscillates. As best shown in FIG. 17, vibratory motor 220 is coupled to a mounting bracket or plate 292 via fasteners 294, and plate 292 is set at a diagonal and coupled via fasteners 296 to sifting carriage frame 228 at the front-right upright post 230 and the right side lower frame piece 234. It will be appreciated that the vibratory motor 220 may be attached to sifting carriage 212 in a different location and/or orientation to adjust the qualities of vibration that it imparts to carriage 212 during operation. Vibratory motor 220 may be selected according to a desired frequency and amplitude, or may be adjustable to provide the desired vibration output for the sifting application, such as with a transducer control 297 provided for that purpose.

In addition to the vibration imparted by vibratory motor 220 and the lateral oscillation imparted by oscillation motor 218, sifting carriage 212 can be vibrated by haptic transducer 222 at higher sonic frequencies and lower amplitudes than is possible with vibratory motor 220. While oscillation motor 218 and vibratory motor 220 may operate at fixed respective frequencies and amplitudes during operation, it is envisioned that haptic transducer 222 may be operated at variable frequencies during a sifting cycle. For example, haptic transducer 222 may be operated at a one frequency for a predetermined amount of time, followed by a higher or lower frequency for an additional predetermined amount of time, and varied continuously or in steps as desired. A sonic signal generator, such as a smartphone or a dedicated sonic output signal device, may be electrically coupled to haptic transducer 222 via a signal cord 298 (FIG. 15), which may be coupled to transducer 222 via transducer control 297, which may include an amplifier, frequency modulator, or the like. For some plant products, haptic transducer 222 may be operated at higher frequencies to obtain lower grade plant particles using higher-energy agitation, and lower frequencies to achieve gentler agitation and higher grade plant particles. As noted above, haptic transducer may impart higher frequency vibrations in the sonic range of about 20 Hz to 20 kHz, but it is also envisioned that frequencies lower than 20 Hz or higher than 20 kHz may be achieved and used if found desirable for particular sifting operations.

Haptic transducer 222 is coupled to the underside of a lower cross-beam 299 that spans across the middle of frame 228 between two of the lower frame pieces 234, and may be used to improve the quality and/or through-put of particles through screen boxes 238 by imparting a higher-frequency agitation to the screen boxes that can be more effective at dislodging particles from the mesh screens 241 of screen boxes 238. While some materials being sifted may be dry and have non-sticky surfaces (e.g., dry gravel or sand), other materials may be somewhat sticky or tacky and therefore more prone to adhering to the mesh screens 241 of screen boxes 238. In that situation, particles that are sufficiently small to pass through the pores or openings in the mesh screens 241 may nonetheless become adhered to the mesh screens rather than falling easily into the catch pans 240. Haptic transducer 222 may therefore be used to impart higher frequency vibrations to screen boxes 238 (compared to vibrations imparted by vibratory motor 220) that are effective at dislodging the adhered particles to increase the percentage of desired particles that will readily fall through to the catch pans 240 during operation of the high volume plant product extraction apparatus 210. This may also reduce the amount of cleaning needed for screen boxes 238 and their mesh screens 241, by minimizing the matter retained along the screen box surfaces after a sifting operation.

In the illustrated embodiment a single haptic transducer 222 is shown coupled to cross-beam 299, essentially at bottom-center of the frame 228. However, alternative placements of the transducer 222 are envisioned, such as along any of the four upright sides of frame 228, or along the top of the frame. It is further envisioned that multiple haptic transducers may be installed at different locations around the frame 228 to impart localized vibrations as desired. The vibrations of each haptic transducer may be synchronized (i.e., the same frequency output at each transducer, at any given time) or may be non-synchronized (e.g., controlled independently), or may be operated in a coordinated but non-synchronized manner such as by commencing with a new frequency at a first transducer at one end of the frame, then changing a second transducer at a middle part of the frame to that same frequency, and then changing a third transducer at the opposite end of the frame to that same frequency while also changing the first transducer to still another frequency, essentially coordinating the transducer output frequencies in a wave-like fashion. The haptic transducers may be sized similarly to transducer 222, or may be larger or smaller (so-called "micro transducers") depending on the desired locations and power output of each transducer.

Other features and components of plant product extraction apparatus 210 include an access door 300 that is openable (FIG. 13) to allow access to sifting carriage 212, screen boxes 238, and catch pans 240 inside sifting chamber 214, and that closes to preclude access during sifting operations. Door 300 includes a latch 302 that is selectively received in a latch retainer 304 along a top-front edge of cabinet 216. Latch 302 may be spring-loaded to provide initial resistance to opening and closing forces applied to door 300, or may be manually-operated so that door 300 cannot be opened without first manually releasing the latch. Optionally, a kill switch 306 may be provided to detect when the door 300 is open, and wired to preclude operation of the motors 218, 220 when the door 300 is open. With door 300 open, or by opening a top panel of cabinet 216, sifting carriage 212 may be entirely removed from sifting chamber 214, such as by detaching upper and lower support beams 252, 260. This allows for easier and more thorough cleaning of sifting chamber 214 and sifting carriage 212.

A power switch 308 is provided along the top of cabinet 212, near the timer 226 and above the side chamber 262 (FIGS. 13 and 18). Power switch 308 is connected to controller 224 via wiring 310 that passes through side chamber 262 as shown in FIG. 15. Wiring 310 also includes signal conductors for timer 226 and for kill switch 306. An antenna wire 312 couples controller 224 to a wireless transceiver antenna for remote wireless operation of controller functions. For example, a laptop computer, tablet computer, or smart phone may be wirelessly communicatively coupled to controller 224 via BLUETOOTH® wireless communications protocol, allowing for control and display of pertinent data regarding operation of extraction apparatus 210. Controller 224 receives electrical power from an external source, such as a 110V or 220V AC power cord with plug or hard-wired connection, through a combined master power switch and circuit breaker 314, and high voltage wiring 316. Electrical power is selectively output from controller 224 to a power receptacle block 318 via wiring 320. Power receptacle block 318 is mounted to divider wall 280, with vibratory motor 220, transducer control 297 (via a power cord 321), and haptic transducer 222 all receiving power from the block 318, which is selectively energized by controller 224. Controller 224 includes wiring splice blocks, circuit breakers, a solid state relay for selectively conveying power in response to power switch 308, and circuitry for communicating with timer 226, kill switch 306, and wired or wireless devices such as smartphones or other computing devices for selecting operating parameters, displaying operating parameters, and the like.

The reciprocating motion imparted by oscillation motor 218 helps to prevent biomass or other materials from "pooling" or "bunching" in each screen box 238, compared to vibration-only systems that can be less effective when biomass can sit in in a substantially fixed location and remain at a substantially fixed orientation while vibrating. The addition of oscillation can keep the materials rolling and rotating during agitation and sifting, to maximize opportunities for desirable particles to fall away from the base material, and through the mesh screen 241. At the same time, the higher frequency vibrations imparted by the vibratory motor 220 can cause large-amplitude agitation of the biomass, resulting in a faster sifting process but at the risk of less desirable biomass being pulverized into small particles and falling through the mesh screen with the more desirable small particles, for a lower-grade particulate product collecting in catch pans 240. The still-higher frequency and lower amplitude vibrations imparted by haptic transducer 222, while simultaneously operating the oscillation motor 218 while leaving vibratory motor 220 powered down, can result in a higher percentage of desirable particles collecting in catch pans 240, without the pulverizing action induced by the vibratory motor 220.

Optionally, a refrigeration system may be added or built into the extraction apparatus 210 so that biomass being sifted is maintained at a sub-freezing temperature. By freezing the biomass during sifting operations, it can be made more brittle to more easily release particles, and the particles themselves can more easily pass through the mesh screens 214, particularly if the particles have sticky outer surfaces at room temperature, and can be rendered less sticky at sub-freezing temperatures. To achieve and maintain suitable low temperatures in the sifting chamber 214, an insulating layer 322 (FIG. 19) may be provided around the sifting chamber 214 and door 300, with a cold air inlet and warmer air outlet in fluid communication with the sifting chamber 214 and plumbed to a refrigeration unit 324 on-demand. Refrigeration unit 324 may be a mechanical compressor-based refrigeration unit that does not emit cryogenic gases. However, it is envisioned that liquefied cryogenic gases may be used to cool the sifting chamber 214 if desired, and in that case with suitable ventilation provided in the vicinity of extraction apparatus 210. A desired freezing temperature of sifting chamber 214 may be about +32 degrees F. to −100 degrees F. (0 degrees C. to −73 C), for example, which is achievable using ultra-low temperature (mechanical refrigeration) freezer technology, or with liquefied cryogenic gases. Such temperatures can achieve "flash freezing" of the biomass, resulting in lower water content and more effective sifting and preservation of the organic materials.

Figure 19:
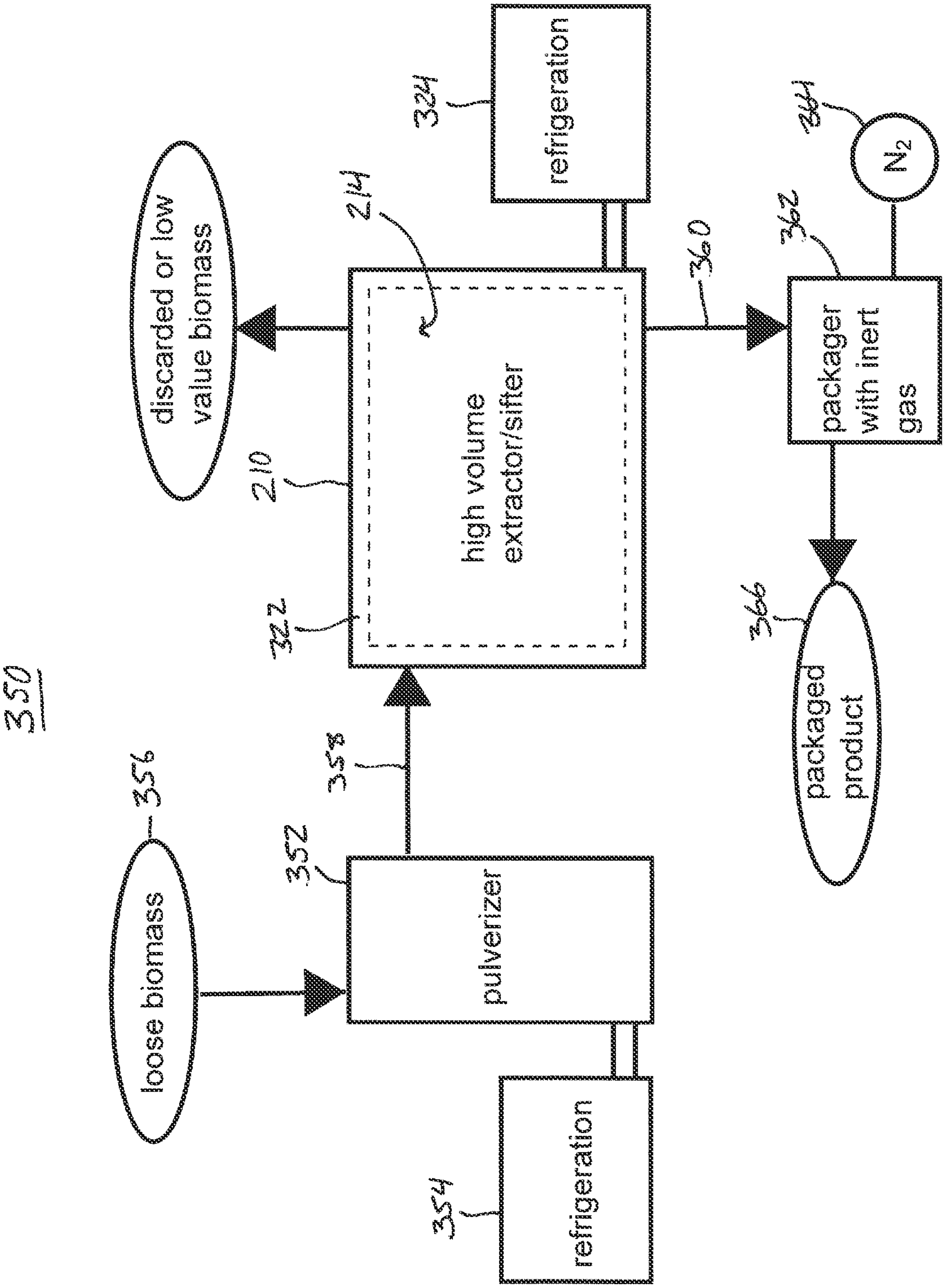
FIG. 19 is a block diagram of a plant processing system of the present invention.

It is envisioned that the high volume plant product extraction apparatus 210 may be incorporated into a plant processing system 350 as shown in FIG. 19. Processing system 350 includes the extraction apparatus 210 with refrigeration unit 324, with the apparatus being supplied with pulverized and pre-frozen biomass (plant matter) by a grinder or hammer mill 352 (pulverizer) having its own refrigeration unit 354 to freeze loose biomass 356 as it is received into the mill 352. Grinding or pulverizing the biomass increases the surface area of the biomass and can result in more efficient extraction of desired particles, in part by reducing the likelihood that desired particles will become entrapped in less desirable biomass that will be left atop mesh screens 241 after a sifting operation. By freezing the biomass 356 in the mill 352, the biomass is rendered more brittle to facilitate pulverizing. The pulverized biomass is fed 358 into extraction apparatus 210, which may be accomplished manually by filling one or more screen boxes 238 with pulverized biomass and inserting them into the sifting carriage 212, or which may be performed by an automated or semi-automated conveyor system. After one or more sifting operations are performed by extraction apparatus 210, optionally while maintaining sub-freezing temperatures using refrigeration unit 324, the desired plant particles are removed 360 to a packaging unit 362. Packaging unit 362 may be a manual, automated, or semi-automated device capable of measuring precise quantities of desired plant particles into airtight packaging, such as sealed bags made of plastic film, and may further be capable of displacing any air in the bags with an inert gas such as nitrogen, which may be supplied from a nitrogen tank 364. Sealed packages 366 are then ready for storage and transport, and may be stored for long periods without refrigeration due to the inert gas environment in the packages 366. Low-value biomass 368 that remains in extraction apparatus 210 after sifting operations may be removed for discarding, or for use in other applications if there is sufficient commercial demand for it.

It is further envisioned that plant processing system 350 may be set up in a fixed installation, such as in a building, or may be set up in a mobile trailer that can be readily moved from one grow facility (or storage facility) to another on an on-demand or scheduled basis. Various "consumables" may be needed to maintain equipment and operations of plant processing system 350, such as replacement mesh screens, liquid cleaners such as ethanol, nitrogen, storage bags, filling sleeves (described below), and the like. It may also be desirable to provide an ultrasonic cleaner for catch pans 240 and screen boxes 238, optionally using a solvent like ethanol to enhance the ultrasonic cleaning operation. Other versions of high volume plant product extraction apparatus may include a continuous-flow apparatus in which, rather than loading and unloading individual batches, loose biomass is supplied to one or more screen boxes in a substantially continuous manner while the screen boxes are agitated, with one or more conveyors receiving desired particulate matter and conveying it away to a packaging or further processing operation in a substantially continuous manner.

Figure 20:
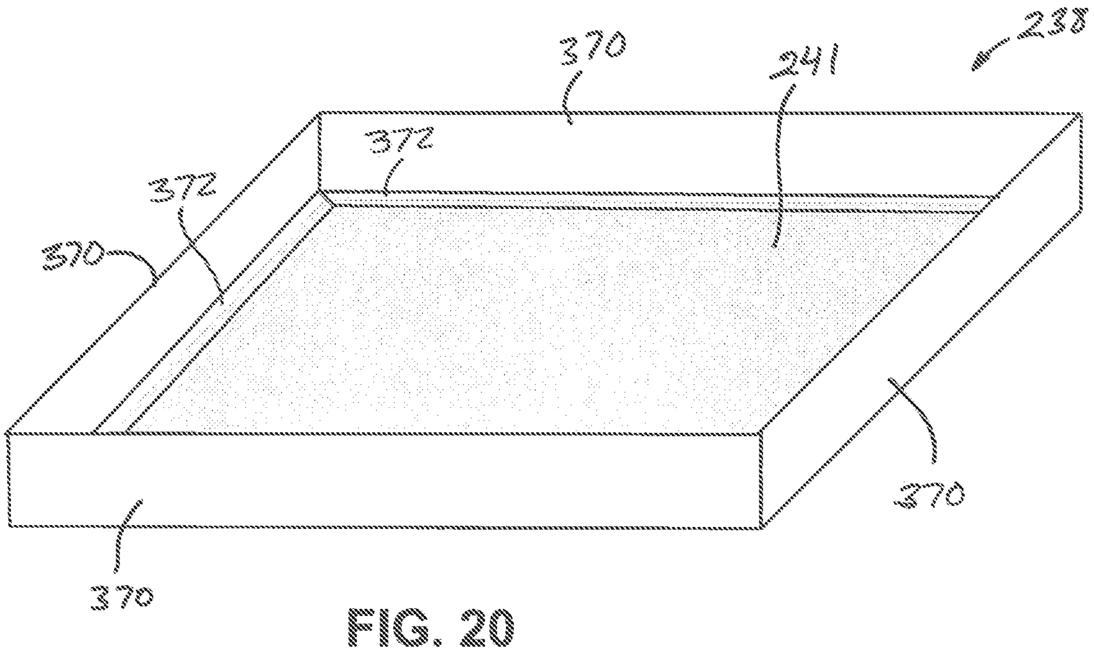
FIG. 20 is a perspective view of a screen box for use with the apparatus of FIG. 13.
Figure 21:
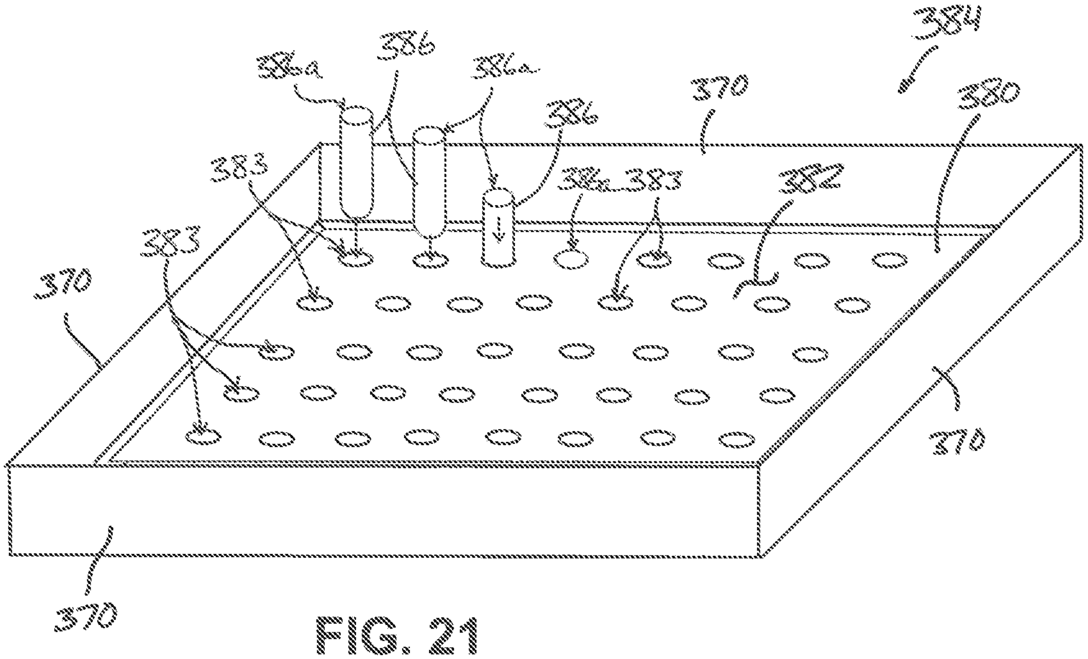
FIG. 21 is a perspective view of a loading box for use with the apparatus of FIG. 13.

Although extraction apparatus 210 is primarily intended for high volume and high speed sifting operations as described above, apparatus 210 may be readily adapted for other functions. For example, as shown in FIG. 20 screen box 238 includes four upright walls 370 connected together to form a rectangular box having a lower flange 372 around its interior perimeter for supporting mesh screen 241. Mesh screen 241 may be readily removed and replaced with a loading insert 380 having an upper surface 382 with a plurality of holes or bores 383, thus converting screen box 238 to a loading box 384 of FIG. 21. Bores 383 receive respective sleeves 386 that are sized and shaped to be inserted into bores 383 with upper edges 386*a* of the sleeves 386 resting flush with upper edges of bores 383, or resting below the upper edges of bores 383. Bores 383 may be blind holes formed in loading insert 380 whose thickness is greater than the height of the sleeves 386, or may be thin-walled cavities extending downwardly from a thin-walled top panel that forms upper surface 382. Optionally, purpose-built loading boxes may be substituted for screen boxes 238 or converted loading boxes 384.

Once screen box 238 is converted to loading box 384, loose materials such as biomass pieces or particles may be placed atop upper surface 382 and the loading box 384 inserted into a frame 228. Oscillation of the loading box 384 by oscillation motor 218 and simultaneous agitation by vibratory motor 220 causes the pieces or particles to fall into the sleeves 386 until little or no loose materials remain atop the upper surface 382. The filled sleeves 386 may then be removed for finishing or storage, and an additional set of sleeves 386 installed into the empty bores 383 so that the filling operation can be repeated. Haptic transducer 222 may also be used to improve the speed at which sleeves 386 are filled during oscillation and vibratory agitation of loading box 384, nonetheless haptic transducer 222 may be energized to facilitate sifting materials in other screen boxes 238 at frame 228. Optionally, only transducer 222, only vibratory motor 220, or only oscillation motor 218, or only two of those, may be operated for filling operations. Depending on the materials to be loaded, experimentation may be used to determine the most efficient combination of motor and transducer operations, and operating parameters, to use for a given filling or sifting operation of a given biomass at sifting carriage 212.

Thus, the plant product extraction apparatuses of the present invention efficiently separate fine plant particles or material from a larger portion of a plant, such as separating trichomes from a stalk or flower of a plant. The apparatuses impart a plurality of different oscillations and vibrations to a sieve apparatus that holds the plant matter. Different modes or patterns of oscillation/vibration can be achieved due to the operation of multiple motors to impart various forms of oscillation/vibration to the sieve apparatus. Oscillation/vibration patterns that can be achieved include back and forth horizontal sliding and rapid shaking. A motor drives a linkage assembly to move a support platform back and forth horizontally along a pair of support rails. A sieve retention tray is supported by the support platform and retains a sieve apparatus on the support platform as the platform slides back and forth. Vibratory motors disposed in the retention tray provide rapid shaking vibration to through the tray to the sieve apparatus. Agitators may be placed inside of the sieve apparatus to facilitate the separation of the plant materials. The coordination between the various motors, haptic transducers, and oscillations/vibrations facilitates the separation of finer plant materials from a larger portion of a plant.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A particle extractor for separating smaller particles of a material from a larger portion of the material, said particle extractor comprising:

- a particle separator adapted for sifting or grading extracted material;
- a plurality of support rails for moveably supporting said separator;
- an oscillator configured to move said separator in an oscillatory motion along a support rail path defined by said support rails; and
- a vibrator coupled to said particle separator and operable to impart a vibratory motion to said separator, said vibrator moveable with said separator relative to said support rails;
- wherein said oscillator and said vibrator are selectively operable to move said separator facilitate separation of small particles from the larger portion of the material.

2. The particle extractor of claim 1, further comprising a separator retention tray coupled with said support rails and configured to support and retain said particle separator during operation of said particle extractor, wherein said retention tray is operable to move back and forth along said support rail path, and wherein said oscillator is configured to mechanically drive said retention tray along said support rail path in a back and forth oscillatory pattern.

3. The particle extractor of claim 2, further comprising a support platform coupled to said support rails and configured to support said retention tray apart from said support rails, wherein said support platform is configured to move back and forth horizontally along said support rail path.

4. The particle extractor of claim 3, wherein said support platform comprises a sifting carriage having a plurality of said particle separators in vertically stacked arrangement.

5. The particle extractor of claim 4, wherein said particle separators comprise a plurality of screen boxes alternating with a plurality of catch pans removably mounted in respective rails of said sifting carriage.

6. The particle extractor of claim 5, further comprising a housing that defines a sifting chamber containing said sifting carriage, a separate chamber where said oscillator is mounted, and a divider wall disposed between said sifting chamber and said separate chamber.

7. The particle extractor of claim 6, wherein said vibrator is coupled to a side of said sifting carriage, and said divider wall defines a recess for receiving said vibrator during oscillating movement of said sifting carriage.

8. The particle extractor of claim 6, wherein said oscillator comprises a motor coupled to a linkage that extends through said divider wall and couples to said sifting carriage.

9. The particle extractor of claim 6, further comprising thermal insulation disposed around said sifting chamber and a refrigeration unit operable to direct refrigerated air into said sifting chamber.

10. The particle extractor of claim 6, further comprising a haptic transducer coupled to said sifting carriage, wherein said haptic transducer is operable at a higher frequency than said vibrator, and said vibrator is operable at a higher frequency than said oscillator.

11. The particle extractor of claim 1, further comprising a haptic transducer coupled to said particle separator, wherein said haptic transducer is operable at a higher frequency than said vibrator, and said vibrator is operable at a higher frequency than said oscillator.

12. A plant processing system comprising said particle extractor of claim 11, a pulverizer operable to break apart the material into a plurality of the larger portions of the material, and a packaging unit operable to receive and package the smaller particles of the material.

13. The plant processing system of claim 12, further comprising a pulverizer refrigeration unit for supplying refrigerated air to said pulverizer, an extractor refrigeration unit for supplying refrigerated air to said particle extractor, and an inert gas supply for directing an inert gas into said packaging unit.

14. The particle extractor of claim 4, wherein said support platform comprises a sifting carriage coupled to said support rails and configured to support said retention tray apart from said support rails, wherein said sifting carriage is movable horizontally along said support rail path in an oscillating movement, said particle extractor further comprising a loading box supported at said sifting carriage, wherein said loading box comprises a panel defining a plurality of bores configured to receive respective sleeves for receiving loose particulate matter placed atop said panel.

15. A biomass agitator comprising:

a tray for supporting biomass particles, said tray having a surface defining a plurality of openings;

a plurality of support rails for moveably supporting said tray;

an oscillator configured to move said tray in an oscillatory motion along a support rail path defined by said support rails; and a vibrator coupled to said tray and operable to impart a vibratory motion to said tray, said vibrator moveable with said tray relative to said support rails;

wherein said oscillator and said vibrator are selectively operable to move said tray to facilitate passing at least a subset of biomass particles through said openings.

16. The biomass agitator of claim 15, further comprising a carriage supporting a plurality of said trays in vertically stacked arrangement.

17. The biomass agitator of claim 16, further comprising a haptic transducer coupled to said carriage, wherein said haptic transducer is operable at a higher frequency than said vibrator, and said vibrator is operable at a higher frequency than said oscillator.

18. The biomass agitator of claim 17, wherein said trays comprise at least one chosen from (i) screen boxes having mesh screens positioned above catch pans, and (ii) loading boxes having panels defining bores configured to receive respective sleeves for receiving loose particulate matter placed atop said panels.

19. The biomass agitator of claim 15, wherein said tray comprises a screen box positioned above a catch pan.

20. The biomass agitator of claim 15, wherein said tray comprises a loading box having a panel defining a plurality of bores configured to receive respective sleeves for receiving loose particulate matter placed atop said panel.

* * * * *